United States Patent
Tokoutsi et al.

(10) Patent No.: US 12,458,091 B2
(45) Date of Patent: Nov. 4, 2025

(54) PLANNING APPARATUS FOR DETERMINING AN ABLATION PROBE PARAMETER FOR A SINGLE ABLATION PROBE OR FOR MULTIPLE ABLATION PROBES

(71) Applicant: KONINKLIJKE PHILIPS N.V., Eindhoven (NL)

(72) Inventors: Zoi Tokoutsi, Eindhoven (NL); Martin Grepl, Eindhoven (NL); Marco Baragona, Delft (NL); Alfonso Agatino Isola, Eindhoven (NL); Jacek Lukasz Kustra, Eindhoven (NL); Ralph Theodorus Hubertus Maessen, Roermond (NL); Karen Veroy-Grepl, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1214 days.

(21) Appl. No.: 16/965,233

(22) PCT Filed: Jan. 17, 2019

(86) PCT No.: PCT/EP2019/051102
§ 371 (c)(1),
(2) Date: Jul. 27, 2020

(87) PCT Pub. No.: WO2019/145211
PCT Pub. Date: Aug. 1, 2019

(65) Prior Publication Data
US 2020/0367591 A1    Nov. 26, 2020

(51) Int. Cl.
*A61B 18/00*    (2006.01)
*A41D 27/20*    (2006.01)
(Continued)

(52) U.S. Cl.
CPC ............. *A41H 33/00* (2013.01); *A41D 27/20* (2013.01); *A61B 34/10* (2016.02); *D06F 89/026* (2013.01);
(Continued)

(58) Field of Classification Search
CPC .... A61B 2034/104; A61B 2018/00577; A61B 2018/00666; A61B 2018/00714
See application file for complete search history.

(56) References Cited

U.S. PATENT DOCUMENTS 9,757,201 B2   9/2017   Hendriks
10,004,479 B2   6/2018   Anand
(Continued)

FOREIGN PATENT DOCUMENTS

CN    107510503 A    12/2017
DE    102007046453 A1    4/2009
(Continued)

OTHER PUBLICATIONS

PCT International Search Report, International application No. PCT/EP2019/051102, Apr. 4, 2019.
(Continued)

*Primary Examiner* — Jaymi E Della

(57) ABSTRACT

The invention relates to a planning apparatus (1) for determining an ablation probe parameter. A thermal energy determination unit determines, in a first part of a planning procedure, a first thermal energy distribution by using a thermal energy function like a Bioheat equation such that a temperature-based condition is fulfilled, which is indicative of a desired treatment outcome for a subject (18). An ablation probe parameter determination unit determines, in a second part, the ablation probe parameter by using a second thermal energy function, which relates a second thermal energy distribution to be caused by the ablation
(Continued)

probe (22) to b) the ablation probe parameter, such that a deviation between the first thermal energy distribution and the second thermal energy distribution fulfils a predefined deviation criterion. This dissection into two parts allows for an improved adaptability of the determination of the ablation probe parameter to different types of ablation procedures.

20 Claims, 20 Drawing Sheets

(51) Int. Cl.
    *A41H 33/00*     (2006.01)
    *A61B 34/10*     (2016.01)
    *D06F 89/02*     (2006.01)
    *A61B 34/00*     (2016.01)

(52) U.S. Cl.
    CPC .............. *A61B 2018/00577* (2013.01); *A61B 2018/00666* (2013.01); *A61B 2018/00714* (2013.01); *A61B 2034/104* (2016.02); *A61B 34/25* (2016.02)

(56) References Cited

U.S. PATENT DOCUMENTS

| | | | |
|---|---|---|---|
| 10,004,557 B2 | 6/2018 | Gross | |
| 10,695,129 B2 | 6/2020 | Dalal | |
| 10,729,499 B2 | 8/2020 | Liu | |
| 10,842,548 B2 | 11/2020 | Sharma | |
| 2010/0063496 A1 | 3/2010 | Trovato | |
| 2010/0185087 A1* | 7/2010 | Nields | A61B 6/035 378/4 |
| 2011/0196385 A1 | 8/2011 | Altrogge | |
| 2013/0072784 A1 | 3/2013 | Velusamy | |
| 2015/0088120 A1 | 3/2015 | Garcia | |
| 2017/0100195 A1 | 4/2017 | Velusamy | |

FOREIGN PATENT DOCUMENTS

| | | |
|---|---|---|
| DE | 102011075738 A1 | 11/2012 |
| JP | 2009233043 A | 10/2009 |
| WO | WO2014004051 A2 | 1/2014 |
| WO | WO2015148378 A1 | 10/2015 |
| WO | WO2016088120 A1 | 6/2016 |
| WO | WO2016161293 A1 | 10/2016 |

OTHER PUBLICATIONS

Altrogge I. et al.; "Modeling, Simulation and Optimization of Radio Frequency Ablation", International Series of Numerical Mathematics, vol. 160, 487-499, 2012.
Schumann C. et al., "Interactive Multi-Criteria Planning for Radiofrequency Ablation", International Journal of Computer Assisted Radiology and Surgery, vol. 10, No. 6, pp. 879-889, 2015.
Pennes H.H. et al., "Analysis of Tissue and Arterial Blood Temperatures in teh Resting Human Forearm", Journal of Applied Physiology, vol. 1, No. 2, pp. 93-122, Aug. 1948.
Oden J.T. et al., "Computational Infrastructure for the Real-Time Patient-Specific Treatment of Cancer, Advances in Numerical Heat Transfer, vol. 3, p. 307-344, 2009.
Troltzsch F. et al., "Optimal Control of Partial Differential Equations: Theory, Procedures and Applications", American Mathematical Society Providence, Rhode Island, Graduate Studies in Mathematics vol. 112, 2010.
Jaberzadeh A. et al., "Pre-Operative Planning of Multiple Probes in Three Dimensions for Liver Cryosurgery: Comparison of Different Optimization Methods", Mathematics Mathematical Methods in The Applied Sciences, vol. 39, Issue16, Special Issue: Mathematical Modelling in Natural Sciences and further Relevant Topics, pp. 4764-4772, Nov. 15, 2016.
Romeijn H.E. et al., "A Column Generation Approach to Radiation Therapy Treatment Planning Using Aperture Modulation", Society for Industrial and Applied Mathematics, SIAM Journal of Optimization, Jan. 2005, vol. 15, No. 3, pp. 838-862.
Caminiti I.D.V. et al., "Adaptive Ablation Treatment Based on Impedance Imaging", IEEE Transactions on Magnetics, vol. 46, No. 8, pp. 3329-3332, Aug. 2010.
Nocedal J. et al., "Numerical Optimization" Second Edition, Springer Verlag (2006).
Baegert C. et al., "Multi-criteria Trajectory Planning for Hepatic Radiofrequency Ablation", International Conference on Medical Image Computing and Computer-Assisted Intervention (MICCAI), Medical Image Computing and Computer-Assisted Intervention, pp. 676-684, 2007.
Chen Q. et al., Model-Based Optimal Planning of Hepatic Radiofrequency Ablation, Mathematical Medicine and Biology: A Journal of the IMA, vol. 34, Issue 3, Sep. 2017, pp. 415-431.

* cited by examiner

PLANNING APPARATUS FOR DETERMINING AN ABLATION PROBE PARAMETER FOR A SINGLE ABLATION PROBE OR FOR MULTIPLE ABLATION PROBES

CROSS-REFERENCE TO RELATED APPLICATIONS

This patent application claims the priority benefit under 35 U.S.C. § 371 of International Patent Application no. PCT/EP2019/051102 filed Jan. 17, 2019, which claims the benefit of European Patent Application No. EP18153701.0, filed on Jan. 26, 2018. These applications are hereby incorporated by reference herein in their entirety.

FIELD OF THE INVENTION

The invention relates to a planning apparatus, a planning method and a planning computer program for determining an ablation probe parameter describing an operation of an ablation probe during an ablation procedure for ablating a part of a subject like a tumor. The invention relates further to an ablation system for ablating a part of a subject which comprises the planning apparatus.

BACKGROUND OF THE INVENTION

The article "Interactive multi-criteria planning for radiofrequency ablation" by C. Schumann et al., International Journal of Computer Assisted Radiology and Surgery, volume 10, pages 879 to 889 (2015) discloses a planning method for determining an ablation probe parameter to be used by a radiofrequency ablation probe for ablating a tumor. This planning method allows for an interaction with a user and considers multiple criteria during the planning procedure. However, this planning method is specific to the used ablation probe, especially to the used type of ablation being radiofrequency ablation. The planning method is therefore not easily adaptable to other types of ablation procedures.

SUMMARY OF THE INVENTION

It is an object of the present invention to provide a planning apparatus, a planning method and a planning computer program for determining an ablation probe parameter describing an operation on an ablation probe during an ablation procedure for ablating a part of a subject, wherein the determination of the ablation probe parameter is more easily adaptable to different types of ablation procedures. It is a further object of the present invention to provide an ablation system for ablating a part of a subject, which comprises the planning apparatus.

In a first aspect of the present invention a planning apparatus for determining an ablation probe parameter describing an operation of an ablation probe during an ablation procedure for ablating a part of a subject is presented, wherein the planning apparatus comprises:

a thermal energy determination providing unit configured to provide a first thermal energy function defining a relation between a first thermal energy distribution to be calculated and a spatial temperature distribution and to provide a temperature-based condition being indicative of a desired treatment outcome for the subject including an ablation of the part of the subject, a thermal energy determination unit configured to determine the first thermal energy distribution by using the thermal energy function such that the temperature-based condition is fulfilled, an ablation probe parameter determination providing unit configured to provide a second thermal energy function providing a relation between a) a second thermal energy distribution to be calculated and to be caused by the ablation probe and b) the ablation probe parameter, an ablation probe parameter determination unit configured to determine the ablation probe parameter by using the second thermal energy function such that a deviation between the first thermal energy distribution and the second thermal energy distribution fulfils a predefined deviation criterion.

Thus, the determination of the ablation probe parameter is divided into two parts, i.e. a first part in which the first thermal energy distribution is determined and a second part in which, given the first thermal energy distribution determined in the first part, the ablation probe parameter is determined. The first part is independent of the type of ablation procedure which will be used for ablating the part of the subject such that based on the result of the first part an ablation-procedure-type-specific ablation probe parameter can be determined. It is hence not necessary to repeat the determination of the first thermal energy distribution, which might need relatively large computational efforts, if the ablation probe parameter should be determined for different types of ablation procedures. The adaptability of the determination of the ablation probe parameter to different types of ablation procedures can therefore be improved.

The ablation probe can be, for instance, a radiofrequency ablation probe or an ablation probe of another type. Moreover, the part of the object to be ablated can be, for instance, a tumor or another part of the subject. The subject is a human being or an animal.

The thermal energy determination providing unit can be a storing unit in which the first thermal energy function and the temperature-based condition can be stored and from which the first thermal energy function and the temperature-based condition can be retrieved for providing the same. However, the thermal energy determination providing unit can also be a receiving unit for receiving the first thermal energy function and the temperature-based condition from another unit and for providing the received first thermal energy function and the temperature-based condition. Also the ablation probe parameter determination providing unit can be a storing unit or a receiving unit.

The deviation criterion is preferentially predefined such that it is fulfilled, if the deviation between the first thermal energy distribution and the second thermal energy distribution is smaller than a predefined threshold and/or minimized. A predefined deviation measure can be used like a sum of squared differences or another deviation measure.

The thermal energy determination providing unit is preferentially further configured to provide a) a spatial distribution of different components of the subject in a region including the part to be ablated and b) thermal properties of the different components, and to provide the thermal energy function such that it depends on the spatial distribution of the different components and the thermal properties of the different components, wherein the thermal energy determination unit is configured to determine the first thermal energy distribution by using the thermal energy function based on the spatial distribution of the different components and the thermal properties of the different components such that the temperature-based condition is fulfilled.

The different components of the subject in the region including the part to be ablated are, for instance, different types of tissue and vessels like blood vessels, which have different thermal properties. The thermal properties can be provided, for instance, as different thermal conductivities for the different components, different blood perfusion parameters for the different components, et cetera. By considering the spatial distribution of the different components and their thermal properties, the quality of the determination of the first thermal energy distribution and hence of the final determination of the ablation probe parameter can be improved.

The thermal energy determination providing unit and the thermal energy determination unit are preferentially configured such that the temperature-based condition is based on a deviation between a provided desired spatial temperature distribution being indicative of the desired treatment outcome, wherein the desired spatial temperature distribution includes temperature values within the part to be ablated, which are larger than a threshold temperature above which the part is ablated, and b) a calculated spatial temperature distribution resulting from using the first thermal energy function while determining the first thermal energy distribution. For instance, the temperature-based condition can be that this deviation should be minimized and/or should be smaller than a predefined deviation threshold value. By using this deviation-based condition the quality of the determination of the first thermal energy distribution and hence of the finally determined ablation probe parameter can be further improved.

The thermal energy determination unit is preferentially configured to provide a user interface allowing a user to intervene in the determination of the first thermal energy distribution. In an embodiment the thermal energy determination unit is configured to provide the user interface such that the user is allowed to define a set of thermal energy distributions, wherein the thermal energy determination unit is configured to determine the first thermal energy distribution such that it is within the defined set of thermal energy distributions. This allows a user to adapt the determination of the first thermal energy distribution and of the ablation probe parameter in accordance with his/her preferences, thereby further improving the adaptability of the planning procedure. For instance, the user interface may allow the user to define an upper limit and/or a lower limit of the thermal energy values of the first thermal energy distribution.

It is further preferred that the thermal energy determination unit is configured such that the deviation of the calculated spatial temperature distribution and the desired spatial temperature distribution is a weighted deviation, wherein deviations in different regions of the subject are considered with different weights, wherein the different regions include at least a first region being defined by the part of the subject to be ablated and a second region which does not include the part of the subject to be ablated, wherein the thermal energy determination unit is configured to provide the user interface such that the user is allowed to define the different weights. For instance, the user can modify the weights such that in the first region the treatment outcome is surely fulfilled, i.e., for instance, the temperature within the first region is surely larger than a temperature threshold above which the part of the subject is surely ablated. The user can choose the weight such that this is true over the entire first region. Then at least close to the first region also in the second region the thermal energy might be relatively high such that also in the second region ablation might occur, although this might contravene the treatment goal in this second region. The user might also define the weights such that in the entire second region surely no ablation occurs, wherein this may result in an incomplete ablation of the first region. By defining the weights, the user can adapt the planning procedure to his/her preferences.

It is also preferred that the thermal energy determination unit is configured to provide an output being indicative of a calculated spatial temperature distribution resulting from using the first thermal energy function while determining the first thermal energy distribution, in order to allow the user to review a corresponding treatment outcome, and to provide the user interface such that it allows the user to modify at least one of the first thermal energy function and the temperature-based condition and to initiate a further determination of the first thermal energy distribution based on the modification. This can ensure that the determined first thermal energy distribution is really in accordance with the user's preferences.

In an embodiment the planning apparatus further comprises an evaluation unit configured to evaluate a calculated spatial temperature distribution resulting from using the first thermal energy function while determining the first thermal energy distribution based on a predefined evaluation criterion, wherein the thermal energy determination unit is adapted to modify at least one of the first thermal energy function and the temperature-based condition and to repeat the determination of the first thermal energy distribution based on the modification, if the evaluation indicates that the calculated spatial temperature distribution and hence the corresponding treatment outcome is insufficient. This can ensure that in an automated way the determined first thermal energy distribution is used for determining the ablation probe parameter only, if the determined first thermal energy distribution is good enough given the predefined evaluation criterion. The determination of the first thermal energy distribution can be repeated based on several modifications, until the determined first thermal energy distribution is good enough given the predefined evaluation criterion. This can lead to a further improved quality of the determined first thermal energy distribution and hence to an improved quality of the finally determined ablation probe parameter.

The ablation probe parameter determination unit can be adapted to determine a single ablation probe parameter or to determine several ablation probe parameters for an ablation probe. In particular, the ablation probe parameter determination providing unit and the ablation probe parameter determination unit can be configured such that the ablation probe parameter includes at least one of a placement of the ablation probe relative to the part to be ablated and a power to be applied by the ablation probe. The ablation probe parameter determination unit can also be adapted to determine one or several ablation probe parameters for several ablation probes. In particular, the ablation probe parameter determination providing unit and the thermal energy determination providing unit can be configured to determine several ablation probe parameters for several ablation probes iteratively, wherein in each iteration step a further ablation probe is considered and one or several ablation probe parameters of at least the further ablation probe are determined by using the second thermal energy function such that a deviation between the first thermal energy distribution and the second thermal energy distribution fulfils the predefined second deviation criterion, wherein the iteration is stopped, if a predefined termination criterion is fulfilled. In particular, the ablation probe parameter determination providing unit and the thermal energy determination providing unit can be configured to consider in each iteration step a thermal energy distribution defined by a difference between the first thermal energy distribution and a thermal energy distribution which has been determined in the previous iteration by using the second thermal energy function. Moreover, the ablation probe parameter determination providing unit and the thermal energy determination providing unit can be configured to determine in an iteration step only the one or several ablation probe parameters of the further ablation probe considered in the respective iteration step This can lead to a further decreased deviation between the first thermal energy distribution and the second thermal energy distribution and hence to a further improved quality of the finally determined one or several ablation probe parameters.

In a further aspect of the present invention an ablation system for ablating a part of a subject is presented, wherein the ablation system comprises:
- a planning apparatus configured to determine an ablation probe parameter describing an operation of an ablation probe during an ablation procedure for ablating the part of the subject as defined in claim 1,
- an ablation probe configured to be operated in accordance with the determined ablation probe parameter.

In another aspect of the present invention a planning method for determining an ablation probe parameter describing an operation of an ablation probe during an ablation procedure for ablating a part of a subject is presented, wherein the planning method comprises:
- providing a first thermal energy function defining a relation between a first thermal energy distribution to be calculated and a spatial temperature distribution and to provide a temperature-based condition being indicative of a desired treatment outcome for the subject including an ablation of the part of the subject,
- determining the first thermal energy distribution by using the thermal energy function such that the temperature-based condition is fulfilled,
- providing a second thermal energy function providing a relation between a) a second thermal energy distribution to be calculated and to be caused by the ablation probe and b) the ablation probe parameter,
- determining the ablation probe parameter by using the second thermal energy function such that a deviation between the first thermal energy distribution and the second thermal energy distribution fulfils a predefined deviation criterion.

In an aspect of the present invention a planning computer program for determining an ablation probe parameter describing an operation of an ablation probe during an ablation procedure for ablating a part of a subject is presented, wherein the planning computer program comprises program code means for causing a planning apparatus as defined in claim 1 to carry out the planning method as defined in claim 14, when the computer program is run on the planning apparatus.

It shall be understood that the planning apparatus of claim 1, the ablation system of claim 13, the planning method of claim 14, and the planning computer program of claim 15, have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
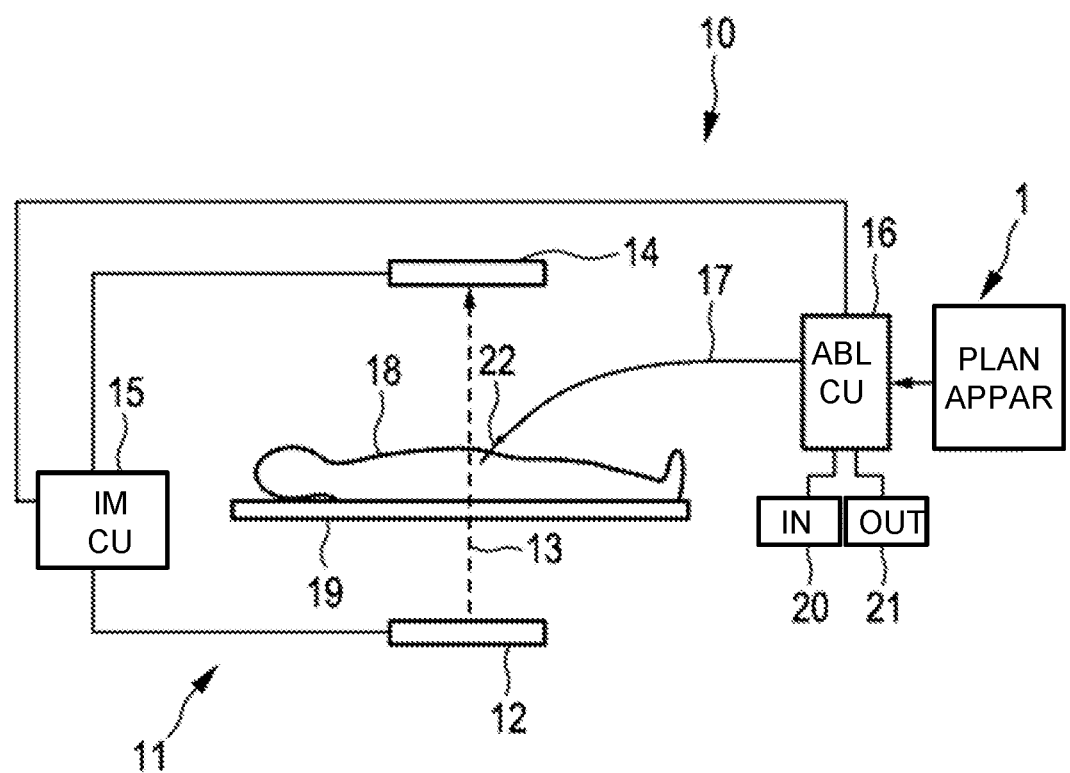
FIG. 1 shows schematically and exemplarily an embodiment of an ablation system for ablating a part of a subject.

FIG. 1 shows schematically and exemplarily an embodiment of an ablation system for ablating a part of a subject. In this embodiment the subject is a person 18 lying on a support means like a patient table 19, wherein an ablation probe 22 is used for ablating a tumor within the person 18. Thus, in this embodiment the part to be ablated is a tumor within the person 18. The ablation probe 22 is connected to an ablation control unit 16 via a cable 17, wherein the ablation control unit 16 is connected to an input unit 20 like a keyboard, a computer mouse, a touch pad, et cetera and to an output unit 21 like a display. The ablation control unit 16 is adapted to control the power applied to the person 18 via the ablation probe 22. The power to be applied to the person 18 via the ablation probe 22 and via the ablation control unit 16 can be input into the ablation control unit 16 by a user by using the input unit 20. However, the power to be applied to the person 18 via the ablation probe 22 and via the ablation control unit 16 can also be provided by a planning apparatus 1 which is configured to determine this power as an ablation probe parameter.

Figure 2:
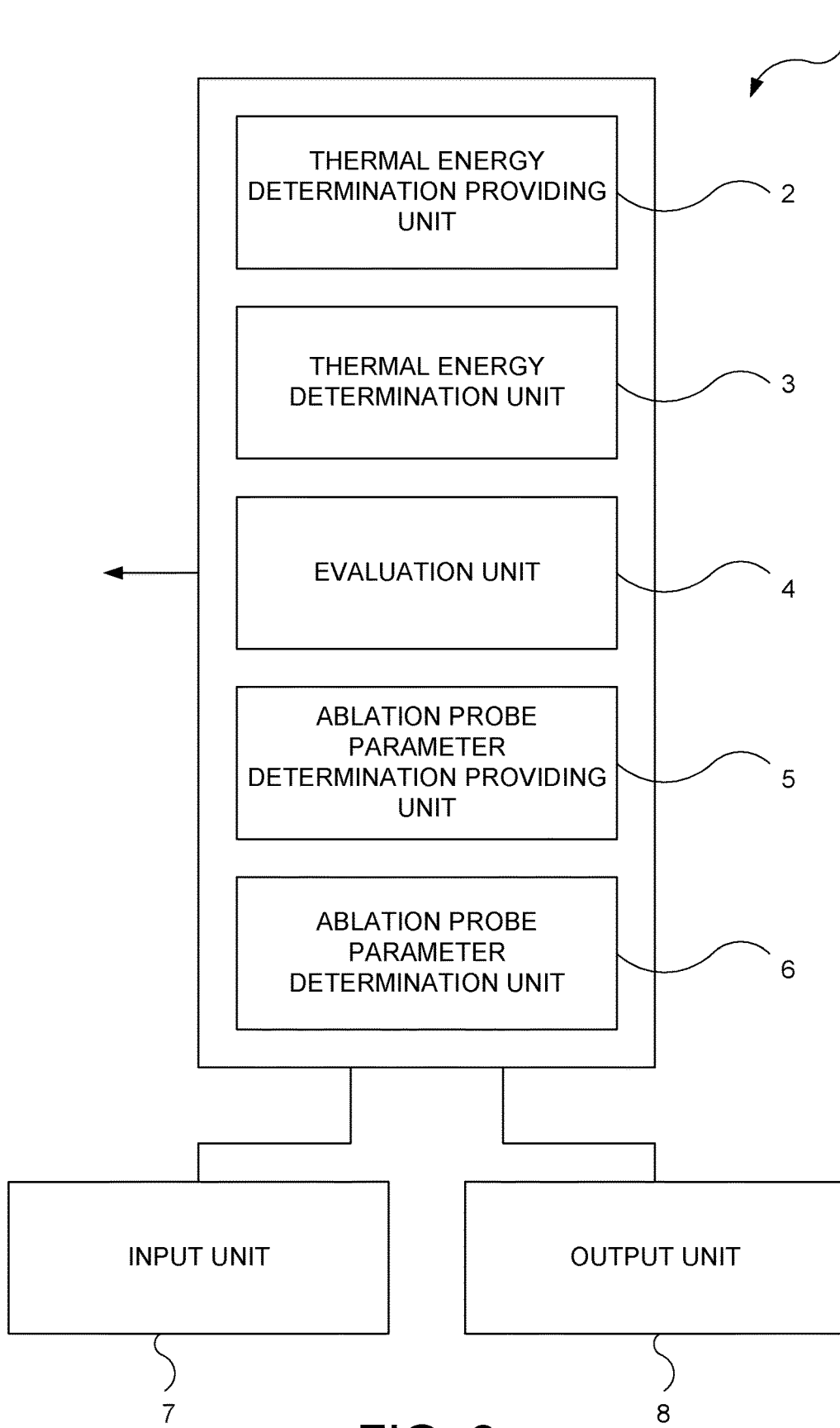
FIG. 2 shows schematically and exemplarily an embodiment of a planning apparatus for determining ablation probe parameters describing an operation of an ablation probe during an ablation procedure for ablating a part of the subject.

The ablation system 10 further comprises an imaging system 11 with a radiation source 12 and a radiation detector 14. The radiation source 12 is configured to emit x-rays 13 which pass the person 18 and which are detected by the radiation detector 14 after having passed the person 18. The radiation detector 14 is adapted to generate detection values being indicative of the intensity of the x-rays 13 which have been detected by the radiation detector 14, wherein the generated detection values are provided to an imaging control unit 15. The imaging control unit 15 is adapted to generate an image showing the inside of the person 18 based on the generated detection values. In particular, the imaging control unit 15 is adapted to generate an x-ray projection image based on the detection values. The imaging control unit 15 can also be adapted to rotate the radiation source 12 and the radiation detector 14 around the person 18, in order to detect the x-rays 13 in different angular directions, wherein the imaging control unit 15 can be further adapted to reconstruct a computed tomography image of the inside of the person 18 based on the corresponding detection values which have been acquired in the different angular directions. The imaging system 11 can be, for instance, an x-ray C-arm system or a computed tomography imaging system. The image generated by the imaging control unit 15 can be provided to the output unit 21 via the ablation control unit 16, in order to show the generated image on the output unit 21. The generated image shows the ablation probe 22 within the person 18, wherein this information can be used for allowing a user like a physician to place the ablation probe 22 relative to the tumor within the person 18 as desired. The imaging control unit 15 and/or the ablation control unit 16 can also be adapted to register the image generated by the imaging control unit 15 with a pre-interventional image in which the tumor and optionally further parts of the person 18 like organs at risk, blood vessels, bones, et cetera are shown. The current position and orientation of the ablation probe 22 can then also be shown relative to the different components shown in the pre-interventional image. The user can place the ablation probe 22 in accordance with a planned placement provided by the planning apparatus 1, wherein the planned placement can be regarded as being a further ablation probe parameter. The ablation system 10 can also be adapted to automatically place the ablation probe 22 in accordance with the provided planned placement, wherein in this case the ablation system 10 might comprise a robotic arm which is controlled in accordance with the planned placement. The planning apparatus 1 is schematically and exemplarily shown in more detail in FIG. 2.

The planning apparatus 1 comprises a thermal energy determination providing unit 2 configured to provide a first thermal energy function defining a relation between a first thermal energy distribution to be calculated and a spatial temperature distribution and to provide a temperature-based condition being indicative of a desired treatment outcome for the person 18 including an ablation of the tumor within the person 18. The planning apparatus 1 also comprises a thermal energy determination unit 3 configured to determine the first thermal energy distribution by using the thermal energy function such that the temperature-based condition is fulfilled. In this embodiment the thermal energy determination providing unit 2 and the thermal energy determination unit 3 are configured such that the temperature-based condition is based on a deviation between a provided desired spatial temperature distribution being indicative of the desired treatment outcome, wherein the desired spatial temperature distribution includes temperature values within the part to be ablated, which are larger than a threshold temperature above which the part is ablated, and b) a calculated spatial temperature distribution resulting from using the first thermal energy function while determining the first thermal energy distribution.

The thermal energy determination providing unit 2 is further configured to provide a spatial distribution of different components of the person 18 in a region including the part to be ablated and to provide thermal properties of these different components. The thermal energy determination providing unit 2 is also adapted to provide the thermal energy function such that it depends on the spatial distribution of the different components and the thermal properties of the different components, wherein the thermal energy determination unit 3 is configured to determine the first thermal energy distribution by using the thermal energy function based on the spatial distribution of the different components and based on the thermal properties of the different components such that the temperature-based condition is fulfilled.

The thermal energy determination unit 3 is also configured to provide a user interface allowing a user to intervene in the determination of the first thermal energy distribution. For instance, the thermal energy determination unit 3 is configured to provide the user interface such that the user is allowed to define a set of thermal energy distributions, wherein the thermal energy determination unit 3 is configured to determine the first thermal energy distribution such that it is within the defined set of thermal energy distributions. Moreover, the thermal energy determination unit 3 is configured such that the deviation of the calculated spatial temperature distribution and the desired spatial temperature distribution is a weighted deviation, wherein deviations in different regions of the person 18 are considered with different weights, wherein the different regions include at least a first region being defined by the tumor of the person 18 to be ablated and a second region which does not include the tumor of the person 18 to be ablated, wherein the thermal energy determination unit 3 is configured to provide the user interface such that the user is allowed to define the different weights.

Figure 3:
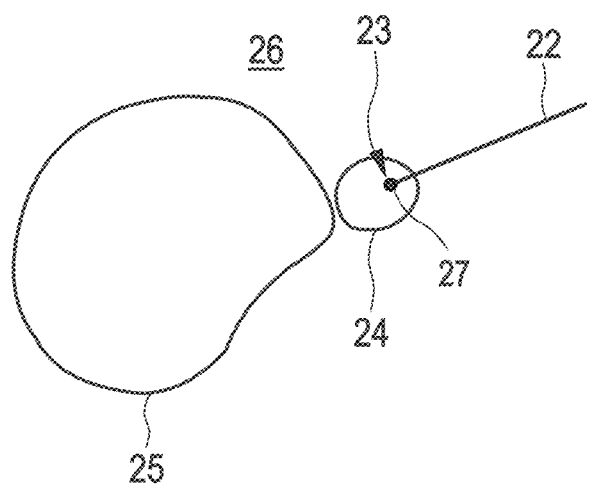
FIG. 3 illustrates schematically and exemplarily different components within the subject.

In this embodiment three different regions are considered, which are illustrated in FIG. 3. FIG. 3 illustrates the tumor 24, an organ at risk 25, which in this embodiment is the second region, and healthy tissue 26 being a third region. In the example illustrated in FIG. 3 the tip 23 of the ablation probe 22 has been placed within the tumor 24. The tip 23 of the ablation probe 22 comprises an ablation electrode 27 which is configured to provide radiofrequency energy for ablating the tumor 24. The power of this radiofrequency ablation is a planning parameter, i.e. an ablation probe parameter, which is determined by the planning apparatus 1 and which can then be set via the ablation control unit 16. Also the placement of the ablation probe 22 and hence of the ablation electrode 27 relative to the tumor 24 is determined by the planning apparatus 1.

In the example illustrated in FIG. 3 the different components of the person 18 in a region including the tumor to be ablated are the tumor 24, i.e. cancerous tissue, a structure at risk 25 like an organ which should not be ablated and healthy tissue 26. In order to provide the spatial distribution of these components, i.e. these domains of interest, person specific imaging data can be segmented accordingly. This segmentation may be done automatically or based on user input. The segmentation can use embedded surfaces and a discretization using a volumetric mesh like a tetrahedral mesh, a hexahedral mesh or another kind of mesh. The segmented and discretized mesh forms a computational domain $\Omega=\Omega_1\cup\Omega_2\cup\Omega_3$, wherein $\Omega_1$ denotes the cancerous domain 24, $\Omega_2$ denotes the structure at risk 25 and $\Omega_3$ denotes healthy tissue 26. Also vasculature information can be considered, i.e. a further component or further domain could correspond to a vessel like a blood vessel. However, in this example the vasculature information will be taken into account in the thermal energy function being in this embodiment a bioheat partial differential equation (PDE) which is based on a description of the diffusion of heat in living tissue and the heat sink effect of blood circulation. The bioheat PDE can be based on the Pennes bioheat model as disclosed in, for instance the article "Analysis of Tissue and Arterial Blood Temperatures in the Resting Human Forearm" by H. Pennes et al., Journal of Applied Physiology, volume 1, number 2, pages 93 to 122 (1948) which is herewith incorporated by reference. Thus, the thermal energy function defining the relation between the spatial temperature distribution and the first thermal energy distribution can be defined as follows:

$$-\nabla(k_{ti}\nabla T)+w_{bl}(T-T_{core})=Q, \quad (1)$$

wherein $k_{ti}$ is the thermal conductivity of the respective tissue, T is the spatial temperature distribution within the person 18 in an area including the tumor 24, the structure at risk 25, the healthy tissue 26 and, if present, one or several vessels, $w_{bl}$ is the blood perfusion parameter of the respective component and $T_{core}$ is the body temperature of, for instance, 37 degrees Celsius. The thermal conductivity and the blood perfusion parameter vary between different components, especially between different tissue types. The different components including a possible vessel and their spatial distributions within the person 18 are obtained by segmenting and discretizing the person specific imaging data as described above. Moreover, in equation (1) Q denotes the first thermal energy distribution within the person 18 in an area including the different components.

The determination of this first thermal energy distribution Q can be regarded as determining a distributed solution of an optimal control problem with an equality constraint. Thus, it can be the function, i.e. the spatial distribution Q, defined over the computational domain, which produces the best approximation of the desired treatment outcome.

The objective function of said optimal control problem is composed of the sum of weighted temperature T dependent components, which describe the spatial temperature distribution and hence the treatment outcome. The general form of such an objective function is $$J(T,Q):=\Sigma_{i=1}^{3}\lambda_i/2J_i^{\{\cdot\}}(T,Q)+\tfrac{1}{2}\int_\Omega Q^2 dx, \quad (2)$$

wherein the index i indicates the domain segmentation and may be larger than the here indicated 3, $\lambda_i$ are weights attributing the importance of achieving a target temperature over each domain segment, i.e. over each of the three different components, $J_i^{\{\cdot\}}(T,Q)$ is a placeholder for a temperature T related component— examples are provided in following sections—and x is a spatial coordinate. The term $\tfrac{1}{2}\int_\Omega Q^2 dx$ is a 1 regularization for the optimal control problem and may be superfluous depending on the component sum taken into account. The resulting optimal control problem can be defined by $$\min_{T,Q\in Q_{ad}} J(T,Q), \quad (3)$$

subject to the non-linear constraint of the PDE (1), wherein this can be regarded as being a temperature-based condition used for determining the first thermal energy distribution. The PDE constraint can be linearized by using, for instance, a variational formulation of the PDE and a finite element (FE) discretization. In equation (3) $Q_{ad}$ denotes an admissible set of heat source functions, i.e. of thermal energy distributions, in order to impose, for instance, minimum and maximum values for Q.

In this embodiment the PDE (1) is based on the Pennes bioheat model. A steady-state situation is considered, wherein the spatial temperature distribution of the heated tissue at thermal equilibrium is utilized in an objective function and compared to the desired temperature distribution $T_d$, i.e. to desired treatment outcome values defining the desired treatment outcome. Hence, in this embodiment the desired treatment outcome is defined by target temperatures. In this embodiment the objective function used by the thermal energy determination unit 3 for determining the first thermal energy distribution can be defined as follows:

$$J(T,Q):=\Sigma_{i=1}^{3}\lambda_i/2J_i^{\{T_d\}}(T,Q)+\tfrac{1}{2}\int_\Omega Q^2 dx, \quad (4)$$

Where $$J_i^{\{T_d\}}(T,Q):=\int_{\Omega_i}(T-T_d)^2 dx. \quad (5)$$

However, in another embodiment another objective function can be provided by using another, more accurate model.

In order to solve the PDE-constraint optimal control problem, i.e. in order to determine the first thermal energy distribution, the thermal energy determination unit 3 can be adapted to employ the equivalent minimization of the Lagrange functional. The Lagrange formulation incorporates the PDE constraint of the optimal control problem (OCP) and the admissibility constraints of $Q_{ad}$ into the objective function using Lagrange multipliers. The minimization of the Lagrange functional can be achieved by solving the Karush Kuhn Tucker (KKT) system of equations which corresponds to the first order optimality conditions of the optimal control problem. If this problem is numerically solved by using an FE discretization, the KKT system becomes a system of linear equations. For more details regarding this kind of solving the PDE-constraint optimal control problem reference is made to the book "Optimal Control of Partial Differential Equations: Theory, Methods and Applications" by F. Troeltzsch, Graduate Studies in Mathematics, volume 112, American Mathematical Society, Rhode Island (2010), especially to paragraph 2.10 of this book for the formal Lagrange method and paragraph 2.12 for numerical methods for solving linear-quadratic elliptic optimal control problems, which are herewith incorporated by reference. In other embodiments the system of equations (1) and (2) and the expression (3) can of course also be solved in another way.

In an analogous way the thermal energy can be specified as a function of time. For this a transient formulation of the diffusion of heat in living tissue is required. For instance the model described in the above mentioned article by Pennes can be used. A similar optimal control problem to (3) can be solved and the distributed time dependent thermal energy can be determined. The corresponding mathematical theory can be found for example in chapter 3 of the above-mentioned book by F. Troeltzsch, which is herewith incorporated by reference. The numerical solution of the problem can be achieved by an iterative minimization method such as the limited BFGS method as disclosed, for instance, in paragraph 7.2 of the book "Numerical Optimization" by J. Nocedal et al., Springer Verlag (2006), which is herewith incorporated by reference.

The thermal energy determination unit 3 is configured to provide an output via the output unit 8 being indicative of a calculated temperature distribution and hence treatment outcome resulting from using the first thermal energy function while determining the first thermal energy distribution, in order to allow a user like a physician to review the calculated treatment outcome, and to provide the user interface such that it allows the user to modify at least one of the first thermal energy function and the temperature-based condition, which in the above described example is defined by equations (2) to (5), via an input unit 7. The user interface is further provided such that it allows the user to initiate a further determination of the first thermal energy distribution based on the modification. Thus, the user can review the result of the calculation of the first thermal energy distribution and decide whether the planning procedure should continue or not based on the review, wherein in the latter case the user can initiate a re-calculation of the first thermal energy distribution Q based on his/her modifications.

The planning apparatus 1 further comprises an evaluation unit 4 configured to evaluate the calculated spatial temperature distribution resulting from using the first thermal energy function while determining the first thermal energy distribution and hence the treatment outcome based on a predefined evaluation criterion, wherein the thermal energy determination unit 3 is adapted to modify at least one of the first thermal energy function and the temperature-based condition and to repeat the determination of the first thermal energy distribution Q based on the modification, if the evaluation indicates that the determined treatment outcome is insufficient. Thus, the evaluation or review of the result of the calculation leading to the first thermal energy distribution can be carried out by a user or automatically, wherein the further planning might only continue, if the review or evaluation indicates that the determined first thermal energy distribution has a sufficient quality in the view of the user or given the evaluation criterion, respectively. In another embodiment the planning apparatus I may not comprise an evaluation unit and the evaluation or review might be carried out by a user only. It is also possible that the evaluation is always carried out automatically and that the thermal energy determination unit 3 is not adapted to provide a user interface allowing the user to review or evaluate the calculated first thermal energy distribution. Moreover, it is possible that a semi-automatic evaluation is carried out, wherein the evaluation unit provides an evaluation proposal, wherein the user can decide based on his/her own review and based on the automatically obtained evaluation result whether the planning can proceed with the present first thermal energy distribution or whether the first thermal energy distribution should be re-calculated. The evaluation criterion can include an estimated ablation zone, a treatment effectivity, a damage inflicted on the structure at risk, et cetera. That means, for instance, an ablation zone can be defined by determining which area within the person receives a temperature being larger than a temperature threshold of, for instance, 64 degrees Celsius, it can be determined if and to which degrees the tumor and the structure at risk are within this ablation zone and these degrees can be compared with an evaluation criterion defining desired or acceptable degrees of ablation for the tumor and the structure at risk. A treatment effectivity might be defined based on ratios of the ablated region relative to the overall region of the respective component. For instance, a first ratio might be calculated for the tumor, wherein this ratio can be the ratio of the ablated tumor volume relative to the overall tumor volume, and a second ratio might be calculated, wherein this ratio can be the ratio of an ablated structure at risk volume relative to the overall structure at risk volume, wherein it can be evaluated that the treatment is sufficiently effective, if the first ratio is larger than a first ratio threshold, particularly, one, and the second ratio is smaller than a second ratio threshold, particularly zero. These thresholds might be predefined and optionally adjustable by a user. Especially in a steady-state case, the ablated and non-ablated volumes might be defined by a comparison of the respective temperature with a temperature threshold. In a time-dependent situation a model estimating thermal damage in tissue like the below mentioned Arrhenius damage integral can be used to determine the ablated and non-ablated volumes at the end of the treatment.

Hence, the decision whether the next step should be carried out depends on the evaluation of the simulated outcome, i.e. of the calculated first thermal energy distribution. This decision can be automatized, but preferentially relies on user input. If the result is unsatisfactory, the user might modify the temperature-based condition by adjusting the weights $\lambda_i$ and/or choosing a different formulation for the objective function and repeat the determination of the first thermal energy distribution. If the result is satisfactory, it is accepted and the planning procedure proceeds.

Although above the first thermal energy distribution has been determined based on prescribed target temperatures $T_d$, it is also possible to determine the first thermal energy distribution in another way, i.e. by using other temperature-based conditions. For instance, lowest or highest temperature penalizations can be determined based on, for example, maximizing the smallest temperature in the tumor, i.e. maximizing, where $$J_i^{\{max/min\}}(T,Q):=\min\{T(x):x\in\Omega_i\}, \qquad (6)$$

wherein i represents a domain where the temperature should be increased, or minimizing $$J_i^{\{min/max\}}(T,Q):=\max\{T(x):x\in\Omega_i\}, \qquad (7)$$

wherein i represents a domain where the temperature should remain close to body temperature. A similar formulation of a min-max type component involves the minimization of the difference between the tissue temperature distribution and the target, i.e. desired, temperature distribution, for example, by minimizing $$J_i^{\{max\}}(T,Q):=\int_{\Omega_i}\max\{T_d-T,0\}^2, \qquad (8)$$

if i represents a domain where the temperature should be increased, i.e. the ablation target, or $$J_i^{\{max\}}(T,Q):=\int_{\Omega_i}\max\{T-T_d,0\}^2, \qquad (9)$$

if i represents a domain where the temperature should remain close to body temperature, i.e. the healthy and risk tissue.

It is also possible to use tissue damage indicator values as desired treatment outcome values, which requires a model for describing tissue injury associated with the thermal therapy. This can for example be modeled according to the Arrhenius injury model $$\Omega(x,t):=\int_0^t \exp(-E_a/RT(\tau))d\tau, \qquad (10)$$

where $\Omega$ is an injury index, A (1/s) is a scaling factor, $E_a$ (J/mol) is an injury process activation energy, R (J/mol/K) is an universal gas constant. This Arrhenius injury model can also be regarded as being an Arrhenius damage integral. The tissue injury can be represented by the injury fraction $$J_i^{\{damage\}}(T,Q) := (1-\exp(-\omega)) \cdot \chi_{\Omega_i}(x), \quad (11)$$

if i represents a domain where the temperature should be increased, i.e. the ablation target, or $$J_i^{\{damage\}}(T,Q) := (1-\exp(-\omega)) \cdot \chi_{\Omega_i}(x), \quad (12)$$

if i represents a domain where the temperature should remain close to body temperature, i.e. the healthy and risk tissue, where $$\chi_{\Omega_i}(x) = 1_{if} x \in \Omega_i, \text{ and 0 elsewhere} \quad (13)$$

is the characteristic function. The optimization problem and thus the temperature-based condition will be to minimize a weighted sum of $J_i^{\{damage\}}$. Another possible component for the desired treatment outcome formulation relies on the penalization of the lowest temperature over the ablation target volume and the penalization of the highest temperature over the risk or healthy tissue. Adding such components in the objective function, for example adding such components in the cost functional of equation (4), enhances the homogeneity of the temperature, i.e. there are less cold/hot spots in the respective target volumes. Examples of functionals of the MinT and MaxT type are:

$$J_i^{minT}(T,Q) = \int_{\Omega_i} H(T_{min}-T) \cdot (T_{min}-T/T_{min})^2 \text{ and} \quad (14)$$

$$J_i^{maxT}(T,Q) = \int_{\Omega_i} H(T-T_{max}) \cdot (T_{max}-T/T_{max})^2, \quad (15)$$

wherein H( ) is the Heaviside functional, Tmin and Tmax represent the minimum/maximum temperature thresholds which should be satisfied over a generic k-th region.

Other formulations of the objective function could include one or more of the aforementioned highest/lowest temperature penalization terms and/or a damage indication term. These terms could be weighted and added to the objective function.

The planning apparatus 1 further comprises an ablation probe parameter determination providing unit 5 configured to provide a second thermal energy function providing a relation between a) a second thermal energy distribution to be calculated and to be caused by the ablation probe 22 and b) the ablation probe parameters. The planning apparatus 1 further comprises an ablation probe parameter determination unit 6 configured to determine the ablation probe parameters by using the second thermal energy function such that a deviation between the first thermal energy distribution, which has been determined by the thermal energy determination unit 3, and the second thermal energy distribution fulfills a predefined deviation criterion. In this embodiment the ablation probe parameter determination providing unit 5 and the ablation probe parameter determination unit 2 are configured such that two ablation probe parameters are determined being a placement of the ablation probe 22 relative to the tumor 24 to be ablated and a power to be applied by the ablation probe 22 via the ablation control unit 16.

The determination of the ablation probe parameters can start with predefined initial ablation probe parameters or by initial ablation probe parameters which are chosen by the user or which are automatically determined by the ablation probe parameter determination unit 6. For allowing the user to provide the initial ablation probe parameters, the ablation probe parameter determination unit 6 can be adapted to provide a corresponding user interface. For automatically providing the ablation probe parameters the ablation probe parameter determination unit 6 can be adapted to use the values and locations of local maxima of the first thermal energy distribution determined by the thermal energy determination unit 3, wherein in the following this already determined first thermal energy distribution is denoted by $Q^*$.

Thus, an initial guess of the placement and control parameters, i.e. the power, for the ablation probe can be chosen by the user or automatically determined. The optimal heat source determined in the first part of the planning procedure, i.e. the first thermal energy distribution $Q^*$ determined by the thermal energy determination unit 3, becomes the target function for the ablation probe parameter optimization. A corresponding deviation and hence objective function, which should be minimized, can be defined by $$f(\mu,P) := Q_G(\mu,P) - Q^*\|_{L^2(\Omega)}^2 = \int_\Omega (Q_G(x;\mu,P) - Q^*(x))^2 dx, \quad (16)$$

wherein $P \in \mathbb{P} = \mathbb{R}$ is the average power during an assumed steady-state ablation simulation or, if a power specification as a function of time is considered, $P - L^2([D \cdot \tau_f])$.

Moreover, in equation (16) $Q_G(\mu, P)$ corresponds to the heat specifically produced by the ablation probe especially around the tip of the ablation probe and hence corresponds to the second thermal energy distribution, wherein u refers to the placement of the ablation probe, i.e. it defines placement parameters defining the position of the ablation probe. The power-placement optimization (PP-OPT) problem could be formulated as follows:

$$(\mu^*, P^*) = \operatorname{argmin}_{\mu \in \mathbb{R}^m, P \in \mathbb{P}} f(\mu, P). \quad (17)$$

Thus, the ablation probe parameter determination unit 6 can be adapted to determine the final ablation probe parameters $\mu^*$ and $P^*$ such that the deviation as calculated in accordance with equation (16) is minimized. To find this minimum can be regarded as being the predefined deviation criterion, i.e. the predefined deviation criterion is fulfilled, if the placement and the power have been determined such that the deviation as defined by equation (16) is minimized.

The PP-OPT problem is a low dimensional non-convex optimization problem which can be solved with common optimization algorithms such as quasi-Newton or trust region methods. For more details regarding these known methods reference is made to the book "Numerical Optimization" by J. Nocedal et al., Springer Verlag (2006), particularly to the quasi-Newton methods in chapter 6, the limited memory quasi-Newton method in chapter 7.2, and the trust region methods in chapter 4, which are herewith incorporated by reference.

Due to the non-convexity of the cost functional there may be multiple local minima for $f(\mu, P)$ which can be determined using, for example, a genetic algorithm (GA), to determine some or all of the local minima of $f(\mu, P)$, which indicate potential probe positions. Subsequently a combination of combinatorial optimization, for determining which and how many probes will be activated and continuous optimization for determining the power settings can be applied.

A GMPP routine can be used for planning the placement of several ablation probes for ablating the tumor. Generally, the ablation probe parameter determination providing unit 5 and the ablation probe parameter determination unit 6 can be configured such that a further ablation probe 22 and a corresponding placement and a corresponding power are considered, if by considering the initial ablation probe and possible placements and powers of this initial ablation probe alone the deviation as defined by equation (16) was not small enough. Thus, the predefined deviation criterion might not only be that a minimum of the deviation should be found, but also that this minimum should be smaller than a predefined threshold, in order to ensure that deviations of the second thermal energy distribution from the first thermal energy distribution, i.e. from the target thermal energy distribution, are not too large. The additional ablation probe and hence the additional placement and power parameters are then used for reducing the deviation as defined by equation (16). In particular, if the GMPP routine is used, during a simulation ablation probes are iteratively placed as long as a termination criterion is not fulfilled. This termination criterion, which might also be named iteration criterion or abort criterion, may be based on a maximum number of added ablation probes, the total heat of the multiple ablation probes, an evaluation of a temperature distribution, which might be obtained, if the resulting second thermal energy distribution $Q(\mu, P)$ is used with the bioheat equation (1), et cetera. If at least one of the termination criteria is fulfilled, then the planning process is completed. If not, then $Q^*$ can be updated to $Q^*-Q(\mu^*, P^*)$, an additional probe placement and probe power can be initialized using, for instance, user input or the values and positions of the maxima of $Q^*-Q(\mu^*, P^*)$ and the loop in accordance with equations (16) and (17) can start again.

The thermal energy determination unit 3 can be configured to determine the first thermal energy distribution in time, i.e. $Q^*=Q^*(x,t)$. Then, the ablation probe parameter determination unit 6 can be configured to determine the power parameter, i.e. the power control, as the average power over the whole time interval $[0, t_f]$ or as a function of time $P^*=P^*(t)$. The objective functions in the first part for determining the first thermal energy distribution and in the second part for determining the ablation parameters, i.e. equations (2) and (16), can refer to the end states of the system or may contain the integrated differences over the time and space as well.

A workflow, which is carried out by using the planning apparatus 1, will in the following be further described with reference to examples which will be illustrated with reference to FIGS. 4 to 13.

Figure 4:
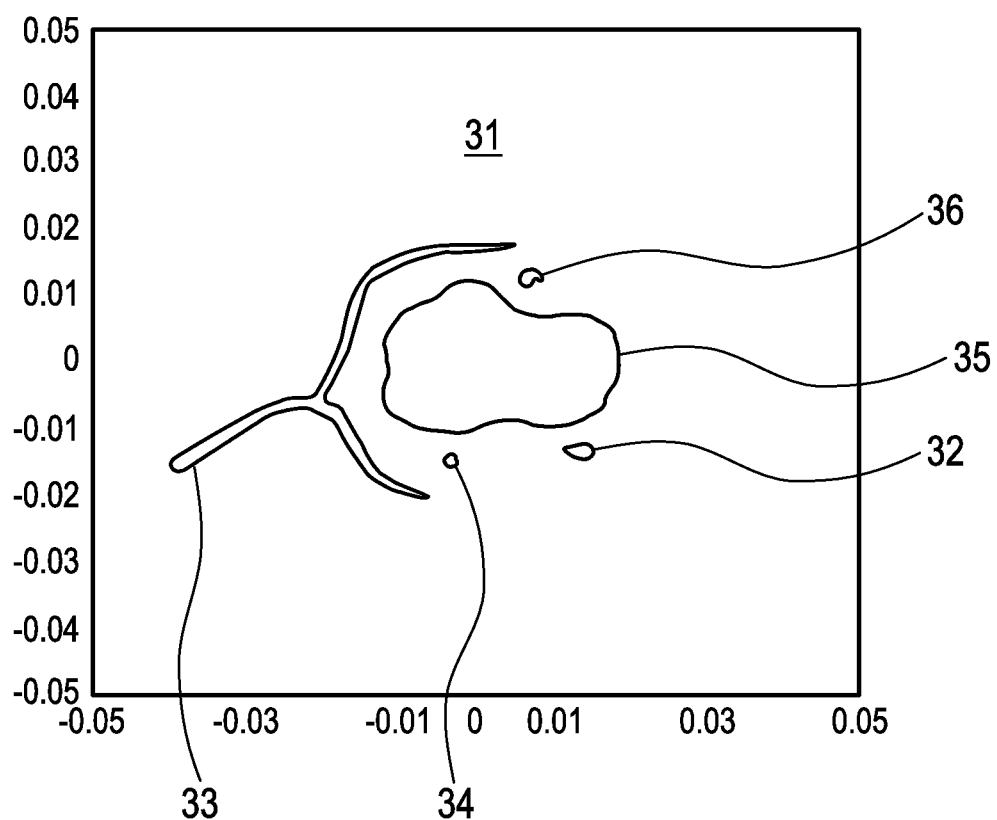
FIG. 4 illustrates schematically and exemplarily a further distribution of different components within the subject.

FIG. 4 illustrates a segmentation of a computational domain representing a region of the person 18, which will be heated. In this example a tumor 35 and structures at risk 32, 33, 34, 36 have been segmented in healthy tissue 31, wherein here the structures at risk 32, 33, 34, 36 are vessels. FIG. 4 is an exemplary two-dimensional representation of the computational domain, wherein the tumor 35 might be a liver tumor surrounded by local vasculature. The segmentation can be used for the heat source simulation, i.e. the determination of the first thermal energy distribution in accordance with equations (1) to (3), especially for defining the thermal conductivity and blood perfusion parameters of the bioheat equation (1).

The planning apparatus 1 enables an intuitive feasibility study of the outcome of the treatment based on requirements set by the user. For the domain exemplarily illustrated in FIG. 4, increasing the weight $\lambda$ of the term in equation (2) in combination with equation (5) that corresponds to the deviation from the target temperature $T_d$ over the tumor area results in the desired full ablation of the tumor, at the cost of inflicting thermal damage on neighboring blood vessels which are the structures at risk in this example. This is illustrated in FIGS. 5 and 6.

Figure 5:
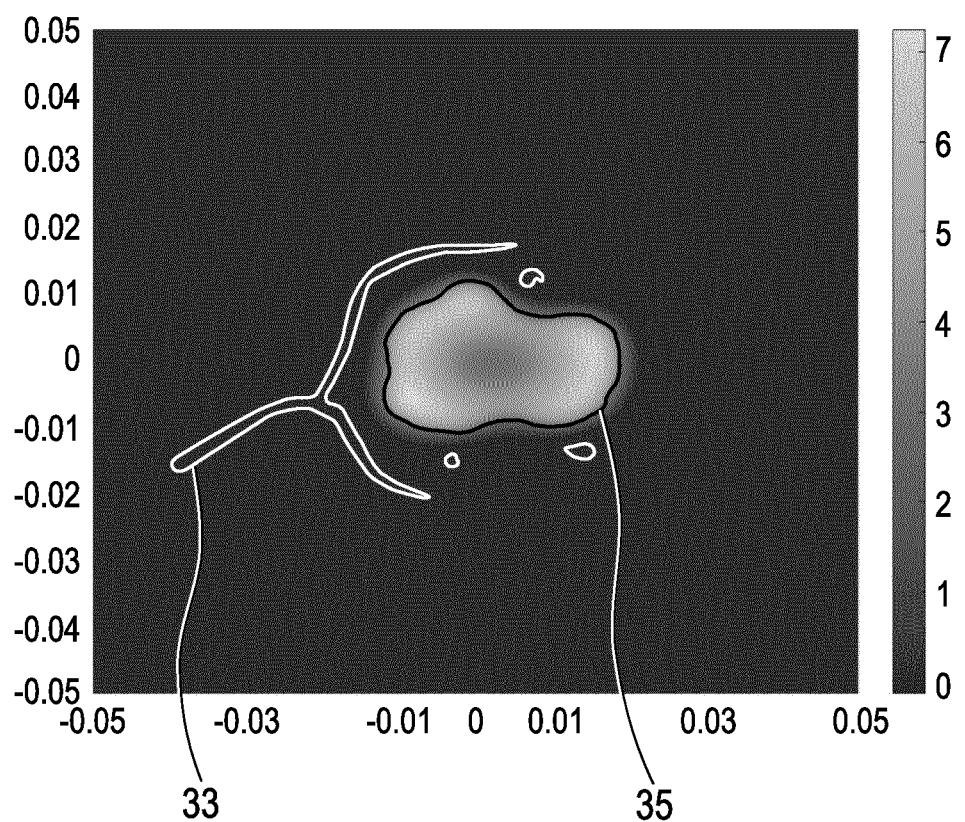
FIGS. 5 and 6 illustrate schematically and exemplarily a first thermal energy distribution and a corresponding temperature distribution for a first example.
Figure 6:
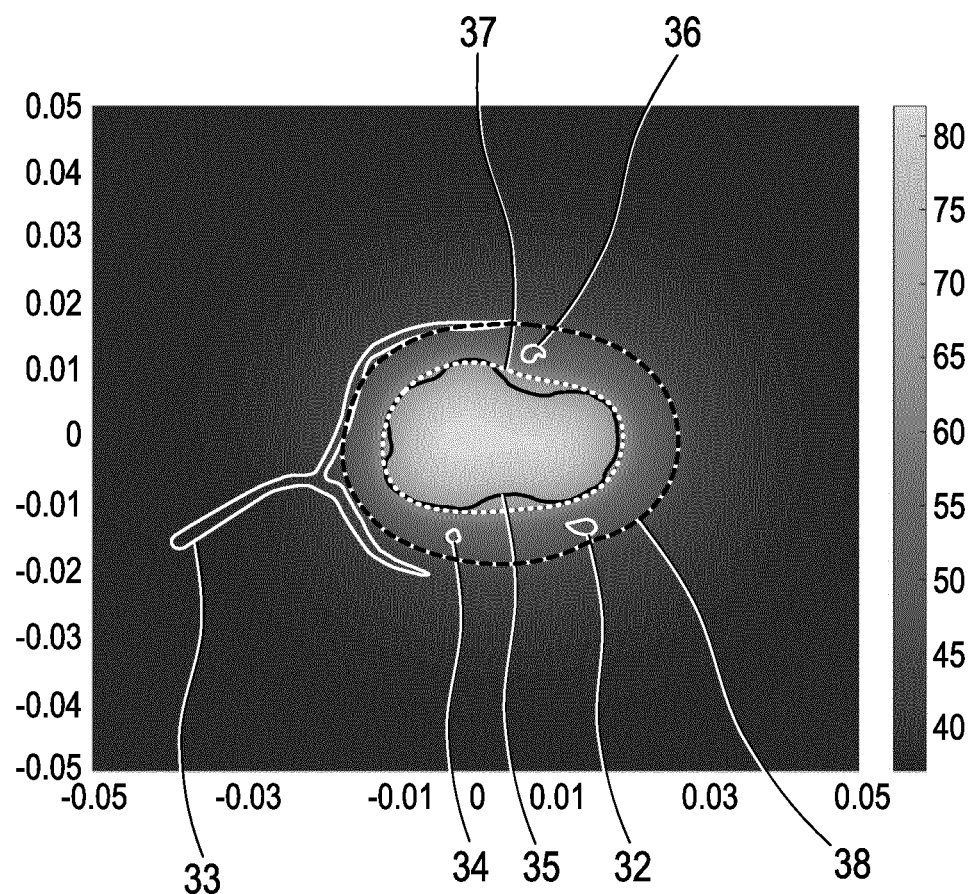

FIG. 5 illustrates schematically and exemplarily a first thermal energy distribution Q as determined by the thermal energy determination unit 3 and FIG. 6 shows a corresponding temperature distribution. In FIG. 6 the contour line 37 corresponds to 64 degrees Celsius and denotes the ablated region, while the contour line 38 corresponds to 47 degrees Celsius and marks the undamaged region. In this example for the region in between these two contour lines 37, 38 any claims cannot be made due to the lack of time-temperature information. Nevertheless, it can be verified that in this example 100 percent of the tumor 36 is ablated. However, 15 percent of the critical structures may have been damaged as well. If, on the other hand, the weight of the temperature difference over the structures at risk is increased, then the ablation region shrinks significantly. In this case and in this example it can then be concluded that full tumor ablation without risking the immediate blood vessels is not possible. The result of increasing the weight of the temperature difference over the structures at risk is illustrated in FIGS. 7 and 8.

Figure 7:
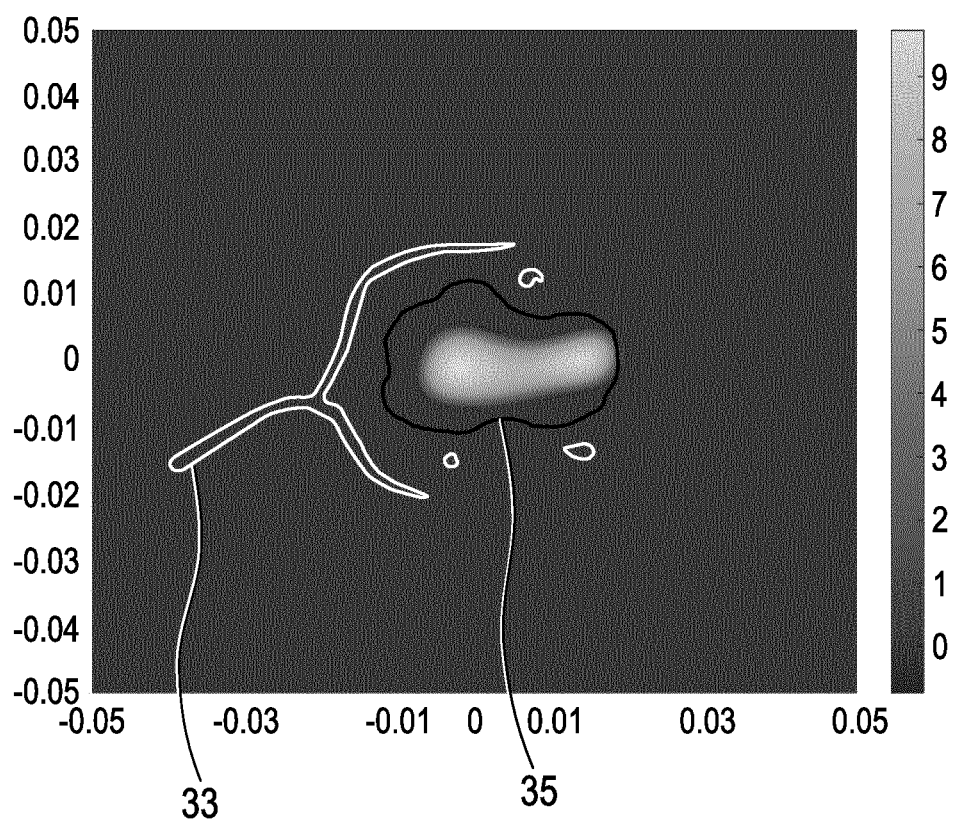
FIGS. 7 and 8 illustrate schematically and exemplarily a first thermal energy distribution and a corresponding temperature distribution for a second example.
Figure 8:
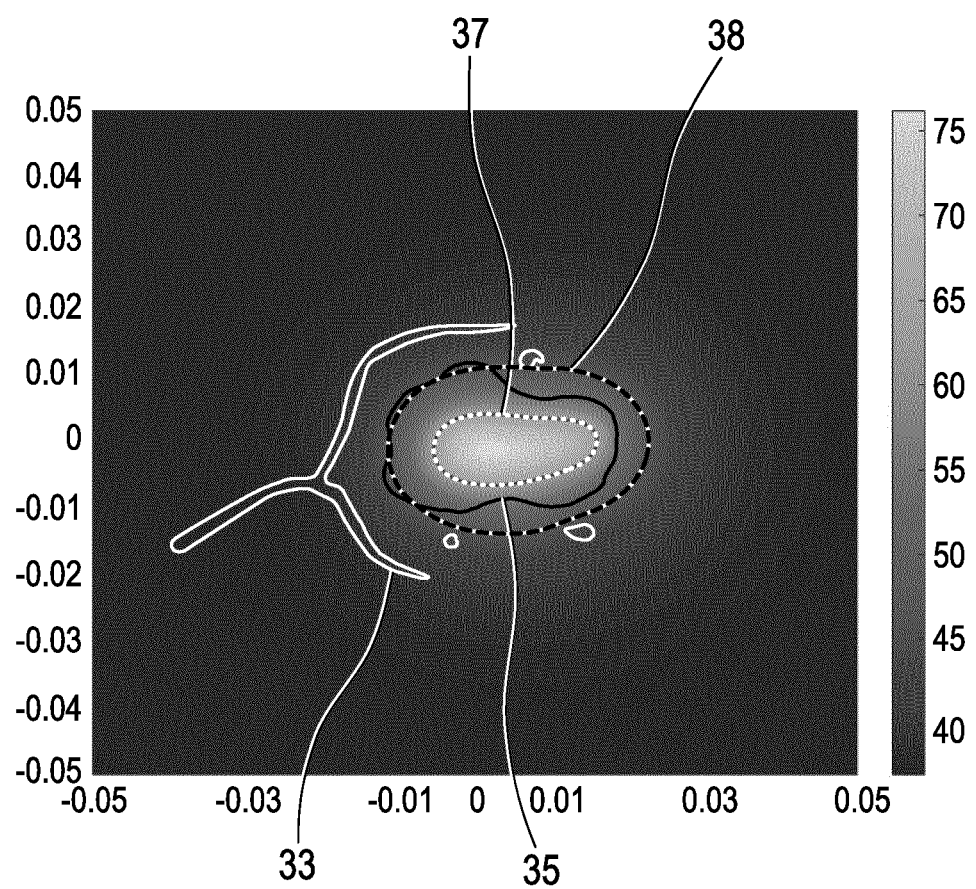

FIG. 7 shows for this case the optimal heat source, i.e. the first thermal energy distribution as determined by the thermal energy determination unit 3, and FIG. 8 illustrates the corresponding temperature distribution. As can be seen in FIG. 8, the contour line 37 corresponding to 64 degrees Celsius is within the tumor 35, i.e. in this case only 36 percent of the tumor would be ablated, while the structures at risk are surely not harmed.

Figure 9:
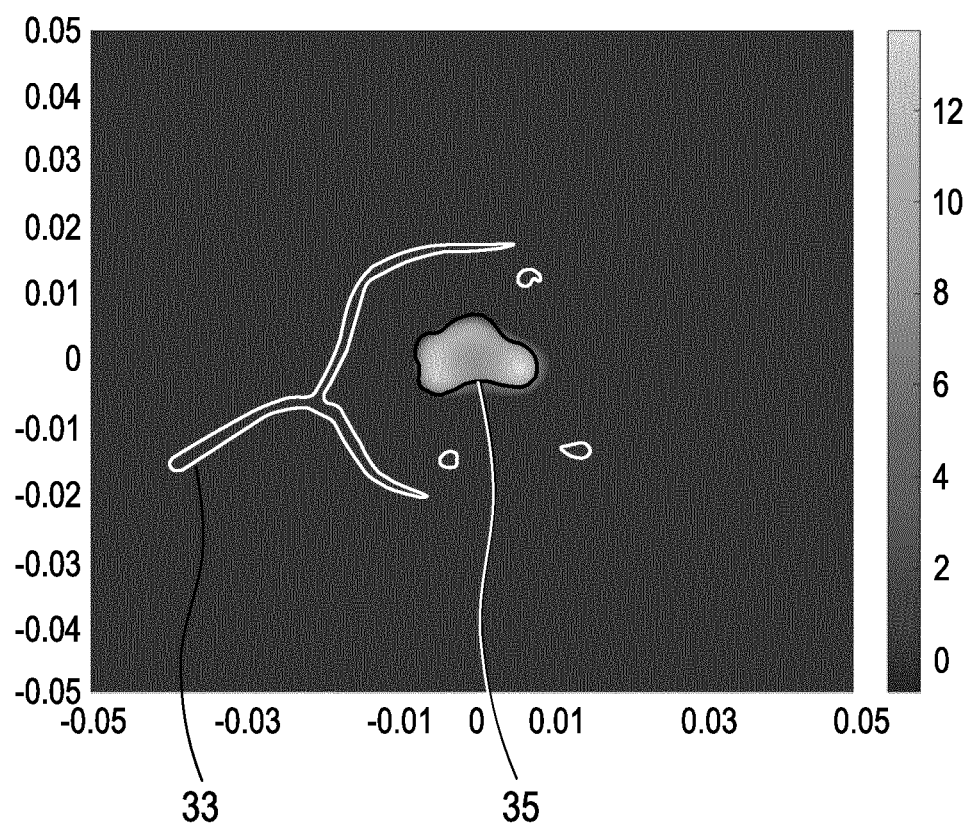
FIGS. 9 and 10 illustrate schematically and exemplarily a first thermal energy distribution and a corresponding temperature distribution for a third example.
Figure 10:
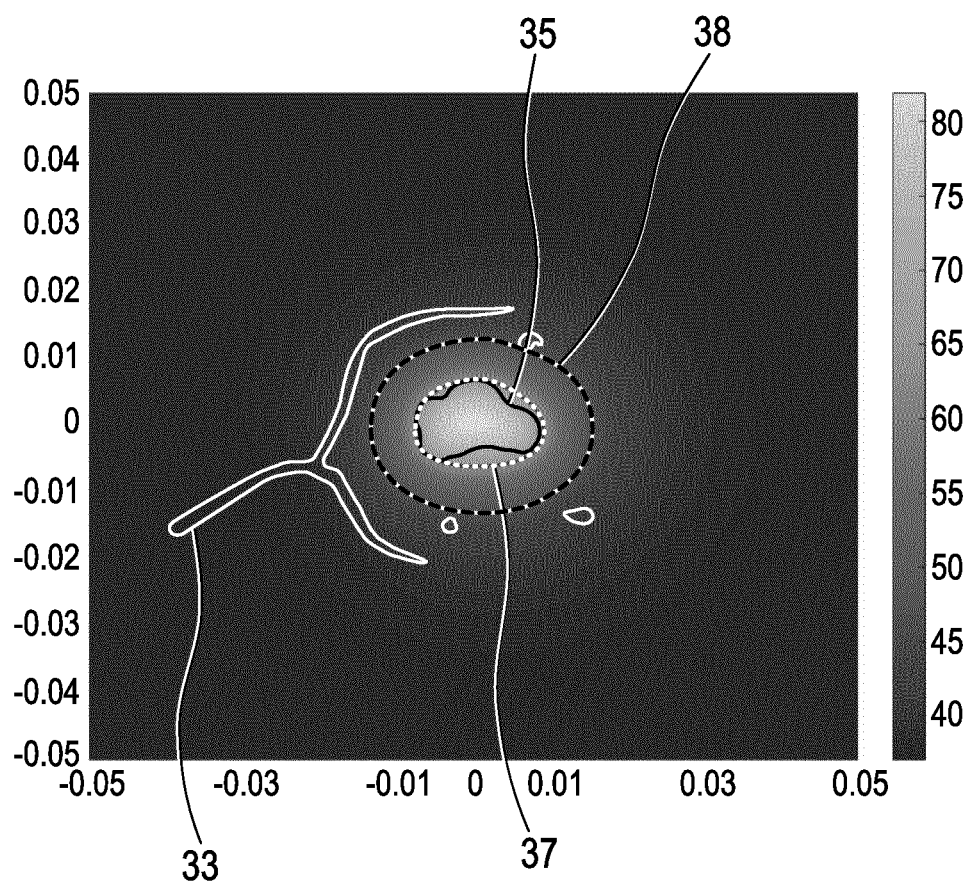

In a further example, which will be explained with reference to FIGS. 9 and 10, the distance between the tumor and the blood vessels is larger, wherein in this example the distance is larger, because the tumor is smaller. FIG. 9 shows for this case the optimal heat source, i.e. the first thermal energy distribution determined by the thermal energy determination unit 3, and FIG. 10 shows the corresponding spatial temperature distribution. In this situation the tumor 35 is completely covered by the ablation zone marked by the contour line 37 which corresponds to 64 degrees Celsius, whereas all structures at risk lie outside the contour line 38 corresponding to 47 degrees Celsius. Thus, in this example 100 percent of the tumor 35 would be ablated, while all structures at risk would not be damaged in any way by the treatment.

Once the user is satisfied with the result, which might be presented as illustrated in FIGS. 6, 8 and 10, the user might indicate this via the user interface of the thermal energy determination unit 3, whereafter the ablation probe parameters can be determined based on the approved first thermal energy distribution.

The second part, i.e. the determination of the ablation probe parameters, can be initialized with a single ablation probe with initial ablation probe power and ablation probe placement, wherein the optimal heat source, i.e. the determined first thermal energy distribution calculated by the thermal energy determination unit 3, is used as target function. The second thermal energy function providing the relation between the second thermal energy distribution to be calculated and to be caused by the ablation probe and the ablation probe parameters is a known thermal energy function which of course depends on the respective ablation probe. For instance, this thermal energy function can be based on a Gaussian function of which parameters could be determined to imitate the decay of the heat across a radial axis of a monopolar radiofrequency ablation probe. In particular, the first thermal energy function could be defined as follows:

$$Q_G(x;\mu,P)=P \exp(-\|x-\mu\|_2^{2/2}c^2), \text{ where } c=2.201e-3, \quad (18)$$

wherein the parameter c is fixed based on a fitting of the Gaussian parameters to a simulation of a radiofrequency induced heat source.

As mentioned above, the initial values for μ and P can be chosen automatically by the algorithm, i.e. by the ablation probe parameter determination unit 6, or provided by the user. The equations (16) to (18) can then firstly be solved by considering one ablation probe. Then, iteratively further ablation probes with placement and power parameters to be determined can be considered, wherein in each iteration step a further ablation probe is added and the equations (16) to (18) are solved.

In this example the ablation probe parameter determination unit 6 determines k second thermal energy subdistributions for k different ablation probes, wherein the resulting overall second thermal energy distribution, i.e. the resulting actual second thermal energy distribution which would be applied to the subject, is defined by $$Q(x)=Q_G(x;\mu^{(1)},P^{(1)})+Q_G(x;\mu^{(2)},P^{(2)})+ \ldots +Q_G(x;\mu^{(k)},P^{(k)}). \quad (19)$$

Figure 11:
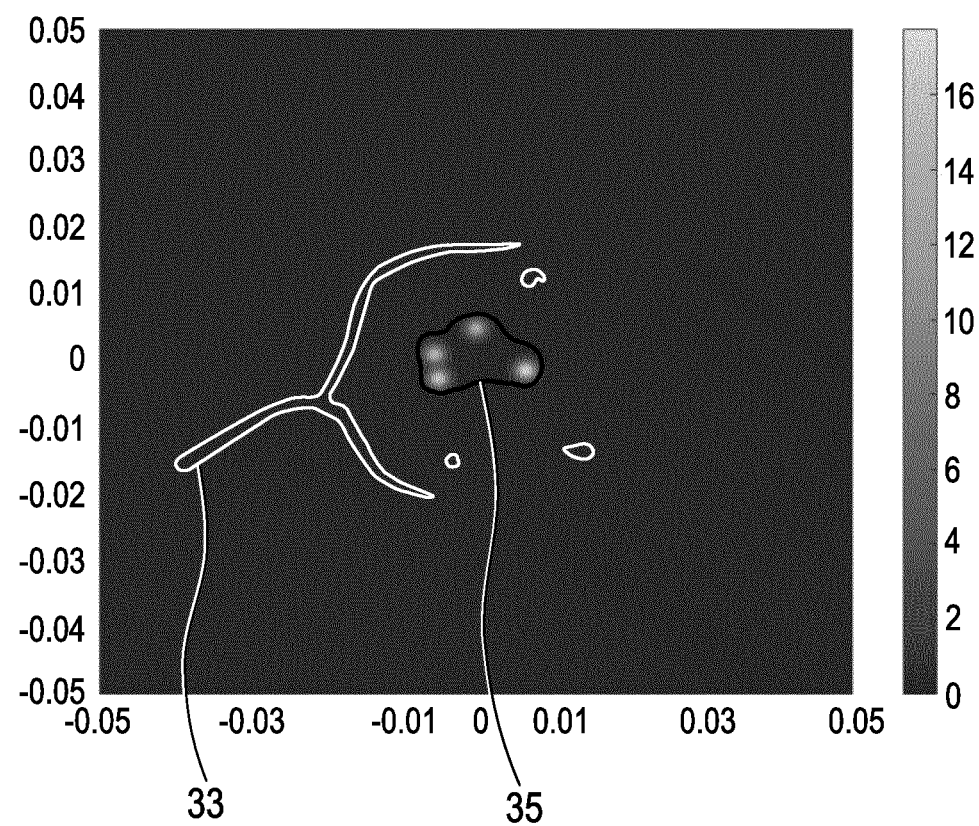
FIGS. 11 and 12 illustrate schematically and exemplarily a sum of the thermal energy distributions determined for the ablation probes and a corresponding temperature distribution.
Figure 12:
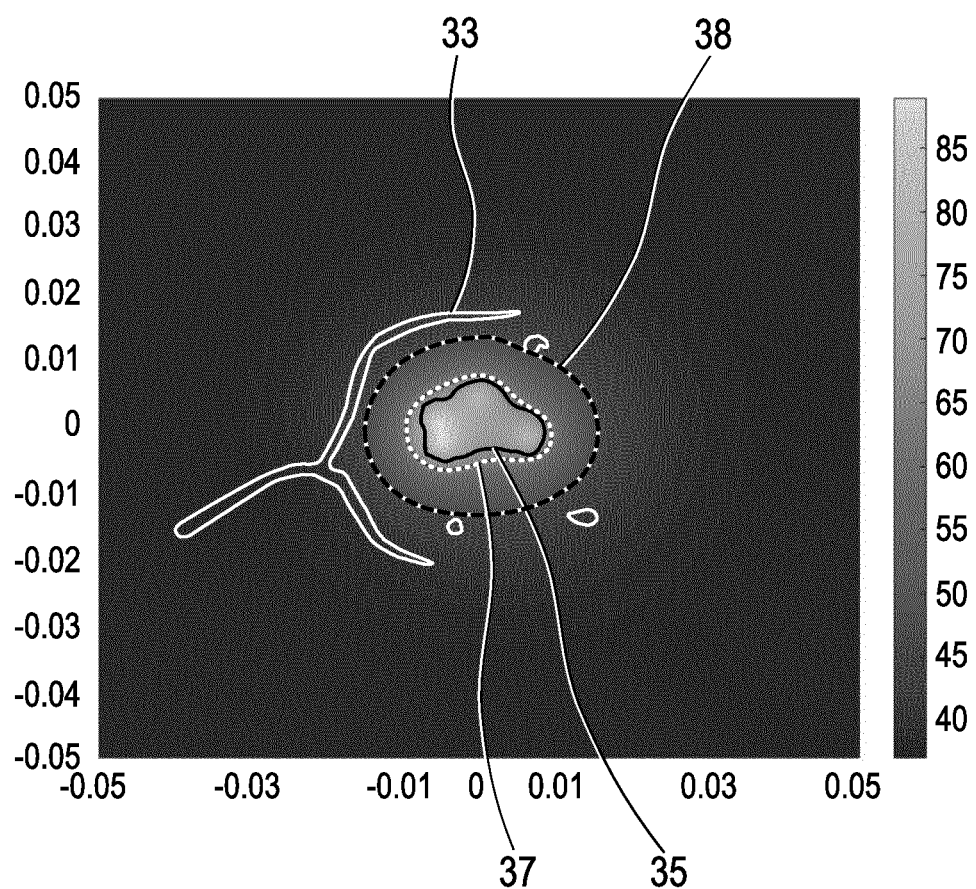

This resulting second thermal energy distribution, i.e. this resulting heat source, is schematically and exemplarily illustrated in FIG. 11. The corresponding temperature distribution is shown in FIG. 12, wherein in this example the tumor 35 is completely within the contour line 37 corresponding to 64 degrees Celsius, i.e. is fully ablated, while the structures at risk are outside the contour line 38 corresponding to 47 degrees Celsius such that these structures at risk would not be damaged.

Figure 13:
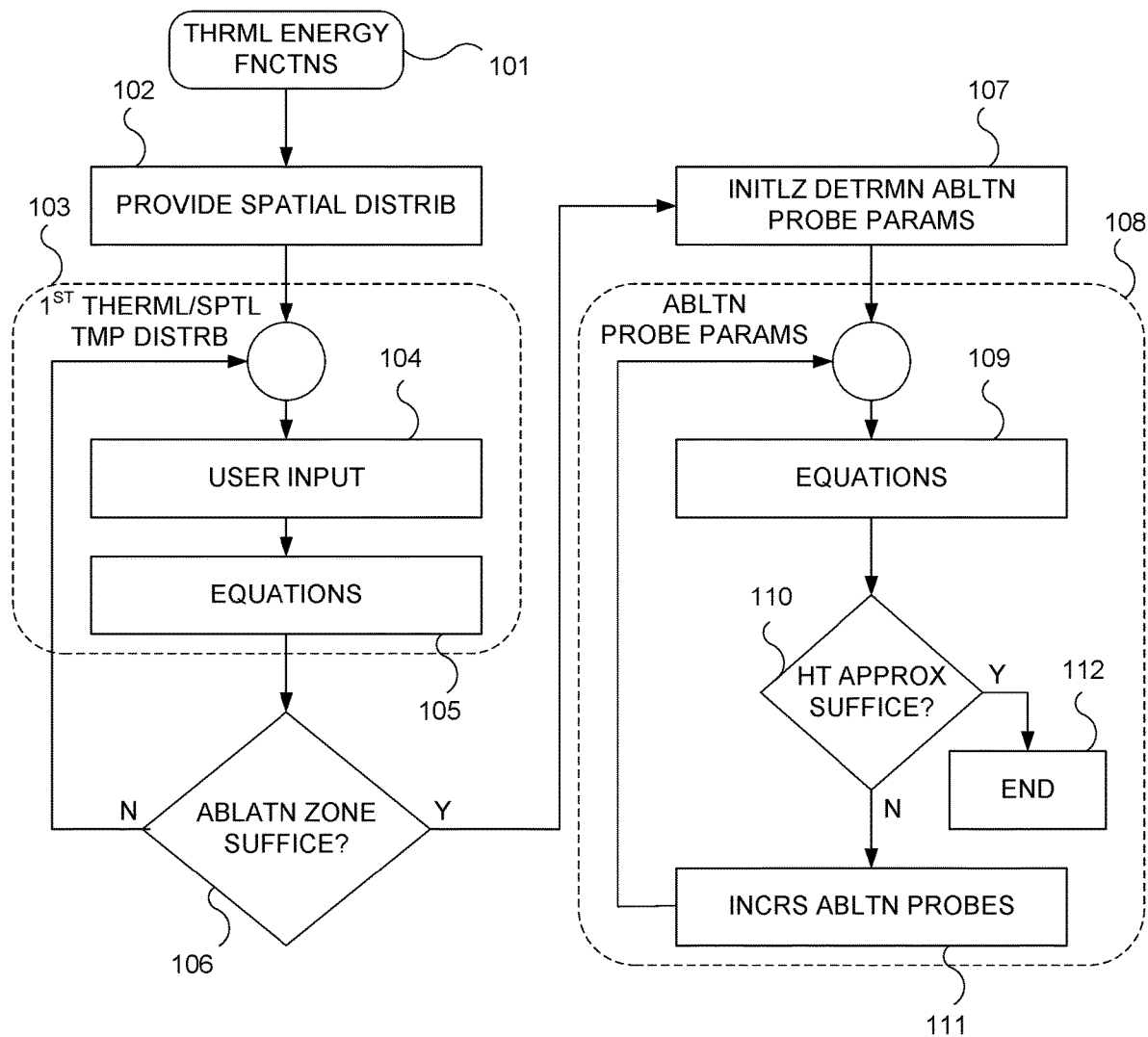
FIG. 13 shows a flowchart exemplarily illustrating an embodiment of a planning method for determining ablation probe parameters describing operations of ablation probes during an ablation procedure for ablating a part of a subject.

In the following an embodiment of a planning method for determining ablation probe parameters describing an operation of ablation probes during an ablation procedure for ablating a tumor of a person will exemplarily be described with reference to FIG. 13.

In step 101 the planning method is initialized by providing a first thermal energy function like the bioheat PDE equation (1) defining a relation between a first thermal energy distribution to be calculated and a spatial temperature distribution and by providing a temperature-based condition being indicative of a desired treatment outcome for the person including an ablation of the tumor, wherein in this embodiment the temperature-based condition is based on a deviation between a provided desired spatial temperature distribution being indicative of the desired treatment outcome, wherein the desired spatial temperature distribution includes temperature values within the part to be ablated, which are larger than a threshold temperature above which the part is ablated, and b) a calculated spatial temperature distribution resulting from using the first thermal energy function while determining the first thermal energy distribution In step 101 also a second thermal energy function is provided, which defines a relation between a second thermal energy distribution to be calculated and to be caused by the ablation probes and the ablation probe parameters. For instance, equation (18) can be provided, wherein the second thermal energy distribution can be defined by the sum of the thermal energy subdistributions Q determined for the respective ablation probe in accordance with equation (18).

In step 102 the spatial distribution of the different components of the person in an area including the tumor to be ablated is provided, i.e. a corresponding domain segmentation is provided, as shown, for instance, in FIG. 4. In step 103 the thermal energy determination unit 3 determines the first thermal energy distribution and a spatial temperature distribution by using the first thermal energy function such that the temperature-based condition is fulfilled, i.e., for instance, such that the deviation of the provided desired spatial temperature distribution being indicative of the desired treatment outcome and a calculated spatial temperature distribution resulting from using the first thermal energy function while determining the first thermal energy distribution is minimized. In particular, in step 104 the user can select desired constraints and/or weights, wherein then in step 105 the system defined by, for instance, equations (1) to (5) is solved, in order to determine the optimal heat source, i.e. in order to determine the first thermal energy distribution. In step 106 it is checked whether the resulting ablation zone, which can be defined by a region comprising temperatures, given the determined first thermal energy distribution, being higher than a temperature threshold of, for instance, 67 degrees Celsius, is sufficient. If this ablation zone completely covers the tumor to be ablated, the method can continue with step 107. Otherwise the method continues with step 104, i.e. the user can modify the constraints and/or the weights and the first thermal energy distribution can be calculated again based on the modification. In step 107 the determination of the ablation probe parameters is initialized, wherein a single ablation probe is assumed and the optimal heat source determined in step 103 and approved in step 106 is used as a target function for the determination of the ablation probe parameters. The determination of the ablation probe parameters itself is carried out in step 108 by using the provided second thermal energy function such that a deviation between the first thermal energy distribution and the second thermal energy distribution fulfills a predefined deviation criterion. In particular, in step 109 the system defined by equations (16) to (18) is solved, in order to determine optimal placement parameters defining the placement of the single ablation probe and a power control parameter defining the power to be applied to the person via the ablation probe at the determined placement. In step 110 it is checked whether the heat approximation is satisfactory, i.e., for instance, whether the deviation between the first thermal energy distribution determined in step 103 and the second thermal energy distribution which would be caused by the ablation probe given the placement and power parameters determined in step 109 is smaller than a predefined threshold. If the heat approximation is satisfactory, the method ends in step 112. Otherwise, the number of ablation probes, which are preferentially needles, is increased by one and the target and cost function is updated in step 111. Based on the increased number of ablation probes and the updated target and cost function the method continues with step 109.

The planning apparatus and planning method address a device control and placement problem in the context of preferentially percutaneous ablation cancer treatments. The goal of the preoperative thermal treatment planning is to determine the placement of the device, i.e. of the one or several ablation probes, and the control of the device power so that the thermal dose delivery results in full ablation of the tumor and minimal or no damage to the surrounding healthy tissue and neighboring organs at risk. Given the person specific imaging data such as computed tomography imaging data, ultrasound imaging data, magnetic resonance imaging data, the tumor volume and the nearby anatomical structures can be identified by, for instance, segmentation. Based on the inflicted organ and the size and the location of the tumor the ablation modality, i.e., for instance, radiofrequency ablation, focused ultrasound ablation, microwave ablation, laser ablation, cryoablation, et cetera, can be chosen by the user being preferentially a physician. The method for the insertion of the ablation probe into the tumor can depend on the inflicted organ, but preferentially this insertion involves freehand device placement. However, the insertion can also be carried out automatically by using, for instance, a robot.

The above-described planning apparatus and planning method dissect the planning problem into two parts and enable a GMPP approach which can either be fully automatized or which can consider user input. The resulting workflow is very adaptable. In particular, it can easily be adapted to different inputs and can thus rapidly achieve coverage of different desired treatment outcome formulations and a variety of ablation modalities. Furthermore, the user is supplied with valuable insights on the ideal device placement and provides an improvement of a placement choice of the user. Known planning apparatuses and methods like the planning apparatus and method mentioned at the beginning of the description may be robust and reliable for a specific ablation modality for which it was developed, but they are highly dependent on the biophysical model describing the modality and cannot be directly adjusted to a different type of ablation treatment.

The above-described planning apparatus and planning method allow for a computation of an optimal heat distribution based on user constraints and interactive user positioning, where the optimal device position, i.e. the optimal placement of the ablation probe, is achieved automatically or semi-automatically, preferentially within an area indicated by the user. The increased adaptability of the planning procedure is achieved by, as mentioned above, dissecting the treatment planning problem into two parts. The first part determines the optimal thermal energy distribution, or optimal heat source, i.e. the first thermal energy distribution, which is needed to produce the desired treatment outcome, i.e., for instance, the desired spatial temperature distribution. This first part might depend only on the constraints prescribed by the user, the local geometric characteristics, i.e. the spatial distribution of the different components within the person, and tissue specific properties like the thermal conductivity and the blood perfusion parameter, while being completely independent of the type of ablation treatment which will be used. This information will provide a first evaluation of the feasibility of the treatment requirements and can be a guide for the user to pick an initial placement of the device. The second part is concerned with the optimization of the device placement and power control, i.e. with the determination of the ablation probe parameters, using the optimal heat source of the first part as target. The thermal energy distribution produced by the ablation probe, i.e. the second thermal energy distribution, is determined, i.e. simulated or approximated, and compared to the optimal heat source, i.e. to the first thermal energy distribution, determined in the first part. Thus, any heat function resulting from various ablation modalities can be used in the second part, without affecting the original optimal thermal energy distribution, i.e. without affecting the determined first thermal energy distribution. This feature ensures that the solution can be easily and efficiently adapted to different ablation modalities, while maintaining the same workflow. Additionally, as described above, the second part can be repeated iteratively to propose optimal placements for additional ablation probes.

In the following further details of the GMPP algorithm will be explained.

Figure 14:
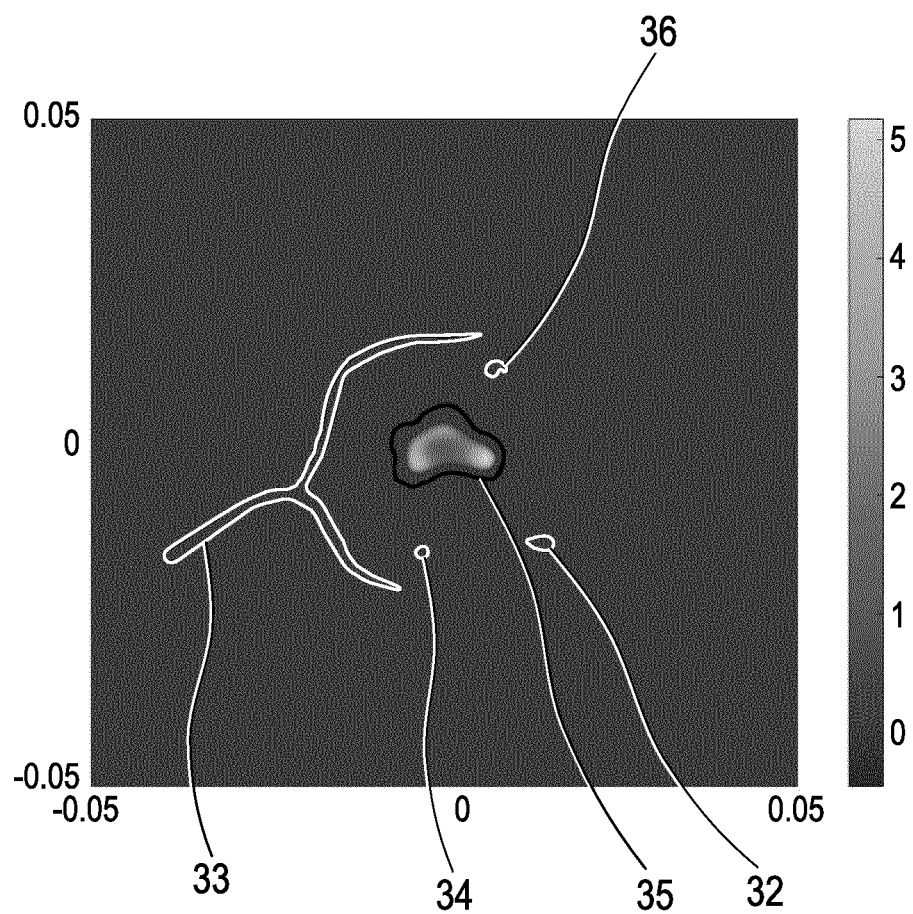
FIG. 14 illustrates an example of a first thermal energy distribution.
Figure 15:
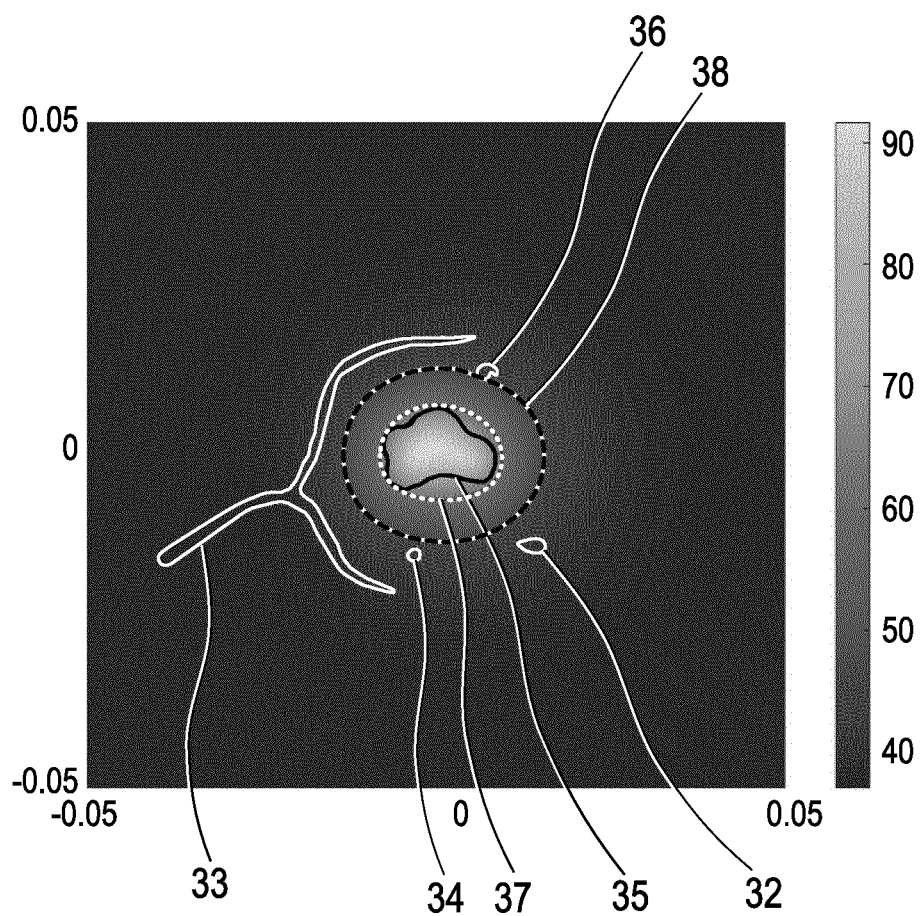
FIG. 15 illustrates an example of a temperature distribution which corresponds to the first thermal energy distribution illustrated in FIG. 14.

The GMPP algorithm iteratively places additional probes until at least one of the termination criteria is satisfied. In particular in every iteration, the three parameters ($\mu_1^{(k)}$, $\mu_2^{(k)}$, $P^{(k)}$) that correspond to the k-th probe are being optimized based on a target thermal energy U. The target thermal energy U is initialized to be equal to the optimal heat of the first part, i.e. the first thermal energy distribution Q* determined by the thermal energy determination unit 3, and is updated on every GMPP iteration by subtracting from it the heat, i.e. the thermal energy distribution, of the currently placed probe. An example of the first thermal energy distribution Q* is illustrated in FIG. 14. A corresponding temperature distribution is illustrated in FIG. 15, wherein in this figure the line 37 marks the ablation zone, i.e. a region in which the temperature is larger than a predefined threshold of, for instance, 64 degree Celsius, and the line 38 marks a surely non-ablated region, i.e. a region in which the temperature is smaller than a further predefined threshold of, for instance, 47 degree Celsius. The following pseudo code describes in more detail the idea:

Input: Q*, tolerances for termination criteria, maximum number of probes
  Output: paramOpt//structure containing placement and power values for all probes placed by the algorithm
  Initialize iteration count k=0
  Initialize target thermal energy U=Q*
  Initialize paramOpt=[·]
  While the termination criteria are not fulfilled do
  Set param0=($\mu$,P)=initialGuess( )
  Solve [$\mu$*, P*, $f$*]=argMin(param0, $f$($\mu$,P,U))
  Check termination criteria
  Update paramOpt[k]=[$\mu$*, P*]
  Update U=U−$Q_G$($\mu$*, P*)
  Update k=k+1
  Go to 4.

In this example following equations are used:

$$f(\mu,P,U)=\|Q_G(\mu,P)-U\|_{L^2(\Omega)}^2=\int_\Omega(Q_G(\mu,P)-U)^2 \qquad (20)$$

Figure 16:
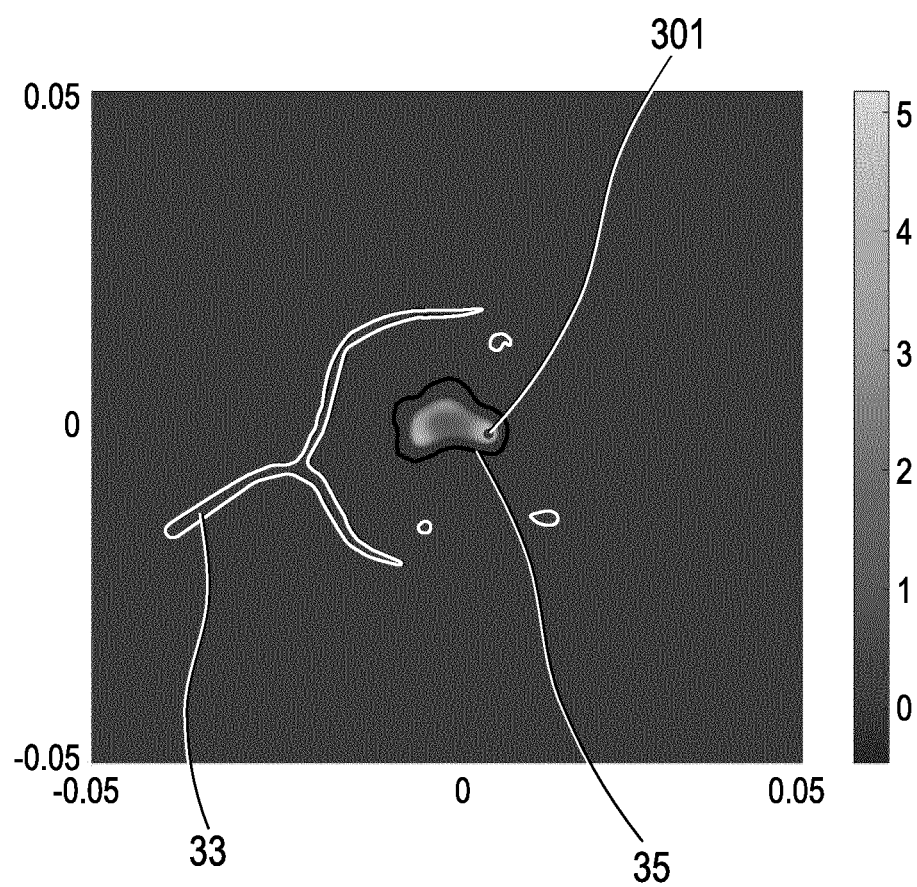
FIG. 16 illustrates an initial placement of a first ablation probe in a first iteration step of a greedy multiple probe placement (GMPP) algorithm.
Figure 17:
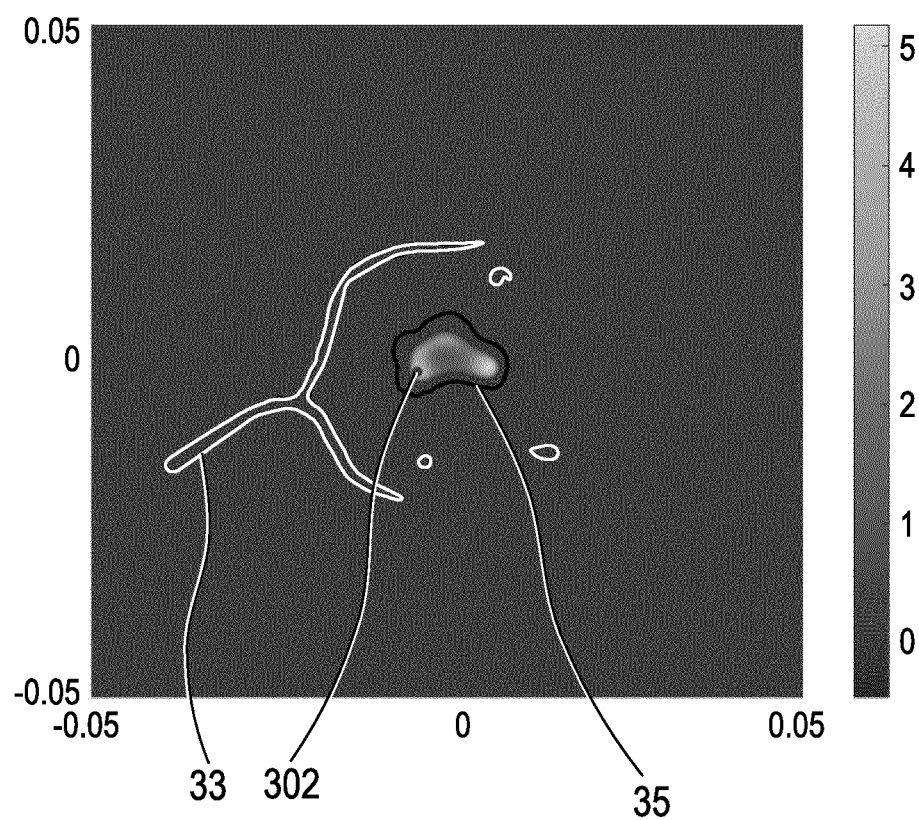
FIG. 17 illustrates an initial placement of a second ablation probe in a second iteration step of the GMPP algorithm.
Figure 18:
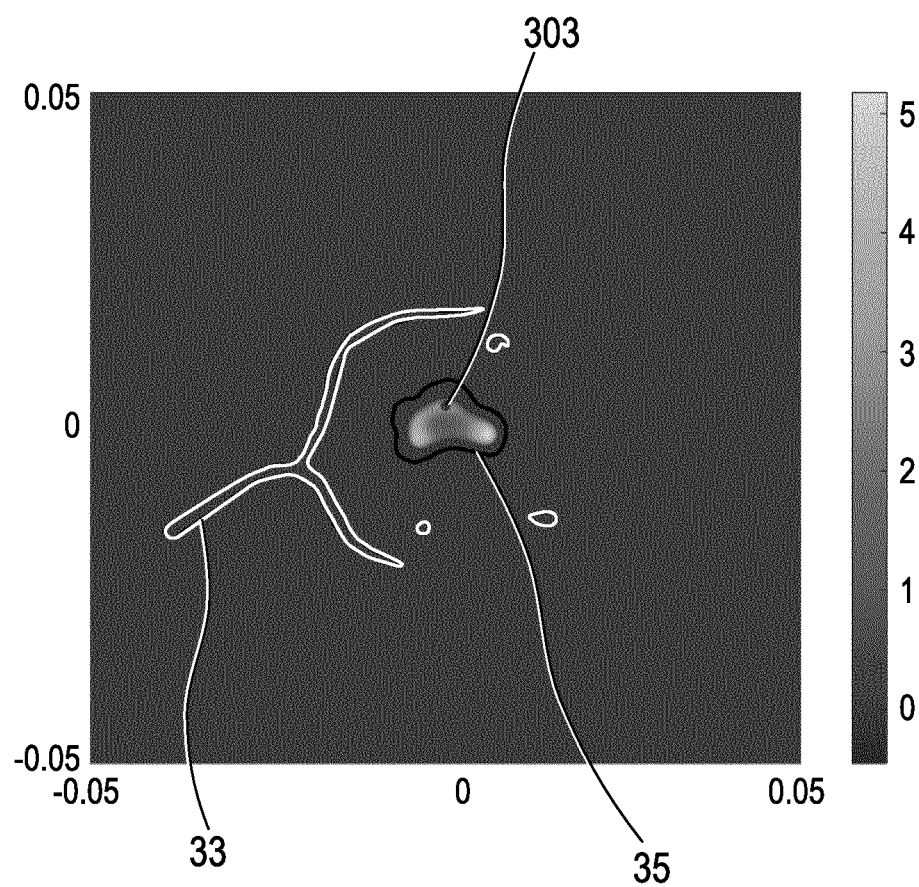
FIG. 18 illustrates an initial placement of a third ablation probe in a third iteration step of the GMPP algorithm.

And $$Q_G(x;\mu,P)=P\exp(-\|x-\mu\|_2^2/2c^2) \qquad (21)$$

and argMin( ) is a method calling an appropriate minimization algorithm, wherein examples for this algorithm will be given further below. In every iteration of the GMPP algorithm, the initialGuess( ) method decides on the initial guess for the placement and power parameters of the currently placed probe. Possible implementations of this method include a user based initial guess, where the uses picks a placement for the probe and a power setting. Alternatively the power could be automatically picked based on the maximum or the average power of U in the vicinity of the probe. The initialGuess( ) can also be fully automatized by picking for example the location and value of the maximum power of U and use this information to determine param0. In these suggestions the local maxima of U are used as an indication for the placement and power of probes. However, this is only a suggestion. The placement and power initial guess can be determined based on the user's experience, the geometrical configuration of the domain (i.e. tumor shape and size and proximity to risk structures), et cetera. FIGS. 16 to 18 illustrate the first thermal energy distribution Q* with three initial placements 301, 302, 303 for three ablation probes, wherein FIG. 16 illustrates the initial placement of a first ablation probe, FIG. 17 illustrates the initial placement of a second ablation probe and FIG. 18 illustrates the initial placement of a third ablation probe. The call of the optimization in GMPP argmin(·) will then improve upon the initial guess based on the current target thermal energy distribution U.

It should be noted that in this two-dimensional example every iteration of the GMPP determines only three parameters, two to specify the position of the probe and a third one for the average power. However in three dimensions six parameters are required to adequately describe the probe position. Finally if the power should be optimized in time, the power parameter will also be of higher dimension. The dimension of P depends on the discretization in time which is chosen for the numerical solution of the problem, or the desired power updates which should be performed during the treatment, for example state of the art radio frequency ablation equipment updates the device power every 30 seconds. Variations of the above idea may include a target thermal energy based optimization of the powers only after every GMPP step, i.e. the placement parameters are fixed and only the powers are optimized by solving $$\min_{P^1,\ldots,P^k} = \tfrac{1}{2}\int_q (\Sigma_{i=1}^k Q_G(x;\mu^{(i)},P^{(i)}) - Q^*)^2 dx. \quad (22)$$

It should be noted that the initial choice for the powers may be the values determined by the GMPP argmin( ) method in line 6 of the above pseudo code or can be initialized at zero.

Variations of the above idea may also include optimizing all power at every GMPP step, i.e. in each step the previously determined positions are fixed while all powers $P^1, \ldots, P^k$ are optimized in argMin( ) in line 6 of the above pseudo code. Moreover, in another variation the optimization of the powers can be temperature based as it will be described further below. These variations can also be combined. Furthermore, also variations of the objective function in equation (16) are possible. For example, a probe-proximity penalization can be included by adding a term penalizing the overlapping of the thermal energy of the currently placed probe with the previously placed probes, as described, for instance, by:

$$f(\mu,P) = \tfrac{1}{2}\int_\Omega (\Sigma_{i=1}^k Q_G(x;\mu^{(i)},P^{(i)}) - Q^*)^2 dx + \Sigma_{i=1}^{k-1}\Sigma_{j=i+1}^k \int_\Omega (Q_G(x;\mu^{(i)},P^{(i)}) - Q_G(x;\mu^{(j)},P^{(j)}))^2 dx \quad (23)$$

In this case the target thermal energy is Q*, i.e. the first thermal energy distribution, in every GMPP iteration.

In an alternative realization, the well-known greedy method called "column generation", which is used for intensity-modulate radiation therapy (IMRT) leaf sequencing and for brachytherapy catheters positioning can also be used to replace the continuous optimizations represented by the argMin( ) function. The column generation method is disclosed, for instance, in the article "A Column Generation Approach to Radiation Therapy Treatment Planning Using Aperture Modulation" by H. E. Romeijn et al., Society for Industrial and Applied Mathematics, Journal on Optimization, volume 15, issue 3, pages 838 to 862 (2005), which is herewith incorporated by reference. In the present case, a three-dimensional discrete grid of potential ablator positions in space is preferentially selected, for instance, in the tumor volume. The best positon from this set is used for determining the gradient of the function $f(\mu^{(k)}, P^{(k)}, U)$ with respect to $P^{(k)}$, where all $P^{(k)}$ for the three-dimensional grid is initially set to zero, while the previously determined $P^{(1)}, \ldots, P^{(k-1)}$ retain their previously optimized values. It should be noted that (k) denotes the current iteration of the GMPP. Generally, a good heuristic is selecting from this three-dimensional grid the position $\mu^*$ where the df/dP is the smallest (most negative). Subsequently, the power values of all currently selected ablators' positions are optimized via Solve [P, f*]=argMin(param0, $f(\mu^*,P,U)$). At first iteration, this method fits with the previously described idea to select the position with maximum U for the initial pick of probe positioning, because that is also where the gradient df/dP is the most negative. The iteration stops when some f change tolerance is reached, a maximum number of ablators is exceeded, and/or the gradient is positive everywhere, i.e. no position is going to improve f. This could be described by following pseudo code:

Initialize $P_{set}=\{\}$, $\mu_{set}=\{\}$, k=0
While termination stopping criteria not fulfilled
Set $P(\mu_k)=0$ for $\mu_k$ in 3D Grid
if(size($\mu_{set}$)>0)
Set $P(\mu_{set})=P_{set}$
End if
////Gradient-based probe selection
//Compute gradient mask
Compute df/dP(P) over all $\mu_k$
Select $\mu_i$ most negative df/dP
////Selected probes' powers optimization
//update selected probe positions/powers
$\mu_{set}=\mu_{set}\cup\{\mu_k\}$//update the $\mu$ parameter set
$P_{set}=P_{set}\cup\{P_k\}$//update the P parameter set
Init $P_{set}=[0 \ldots 0]$
Optimize $P_{set}$=argmin_$\{P_{set}\}(f(\mu_{set},P_{set}))$
Update k=k+1
End while Here, argmin_{Pset} is→argmin$_{P_{set}}$, we minimize the functional f(mu$_{set}$, $P_{set}$) w.r.t $P_{set}$ where $P_{set}$ are the powers of the currently selected ablator sources at positions mu$_{set}$ at iteration k-th.

In this example the termination criteria can be defined by, for instance, a maximal number of iterations, a maximal function f precision, a maximal number of ablation probes to use and/or checking whether df/dP is positive everywhere (no probes will further minimize the function f). Further examples for termination criteria are: a) achieve tolerance for the difference between the target thermal energy Q* and the current summed probe thermal energy $\Sigma_k Q_G(\mu^{(k)}, P^{(k)})$, measured in a relevant error norm, b) achieve tolerance for the value of the cost functional $f(\mu^{(k)}, P^{(k)}, U^{(k)})$, c) reach maximum number of iterations, d) attempt to place a heat sink, i.e. $P^{(k)} \leq 0$, and e) breach proximity tolerance: i.e. place probe too close to previously placed probe.

Depending on the realization of the method, the above or other problem relevant criteria can be used for stopping or adjusting the GMPP iterations. The criteria can be weighted according to significance, and be used to either abort the placement iterations automatically or to interact with the user in order to determine how to proceed. For example the user could provide a different initial pick and let the GMPP iterate again. Finally, in some of the above cases, if the algorithm exits the GMPP iterations, the last placed probe may be discarded, for example in the case of a heat sink placement, or of a proximity breach. These specifications and adjustments are application dependent and do not affect the essence of the multiple probe placement method we proposed.

In a modification of the embodiment described above with reference to FIG. 13 between step 110 and the end 112 a further step of optimizing the power of each probe based on the target temperature is added. This will be explained in more detail in the following. In this additional step the placement parameters of all probes placed by the GMPP algorithm are fixed and a final power optimization is carried out based on the desired treatment outcome. For example, if a target temperature based desired treatment outcome formulation is used and the steady state scenario of K placed probes is considered, then K average powers $P=(P^{(1)}, \ldots, P^{(K)})$ are optimized by solving the following constrained minimization problem:

$$P^{}=(P^{(1)}, \ldots, P^{**(K)})=\arg\min_{P\geq 0} (\lambda/2\int_{\Omega_1}(T_P-T_d)^2 dx + 1/2\int_{\Omega_2}(T_P-T_d)^2 dx) \quad (24)$$

where $T_p$ is the solution to the Bioheat equation with the heat source $$Q(x)=\Sigma_{i=1}^K Q_G(x;\mu^{(i)},P^{(i)}). \quad (25)$$

It should be noted that this is one possible realization of this step. Other desired treatment outcomes could be used as well. Furthermore in the time (t) dependent case an analogous problem can be solved, where $$P=P(t)=(P^{(1)}, \ldots, P^{(K)}). \quad (26)$$

Figure 19:
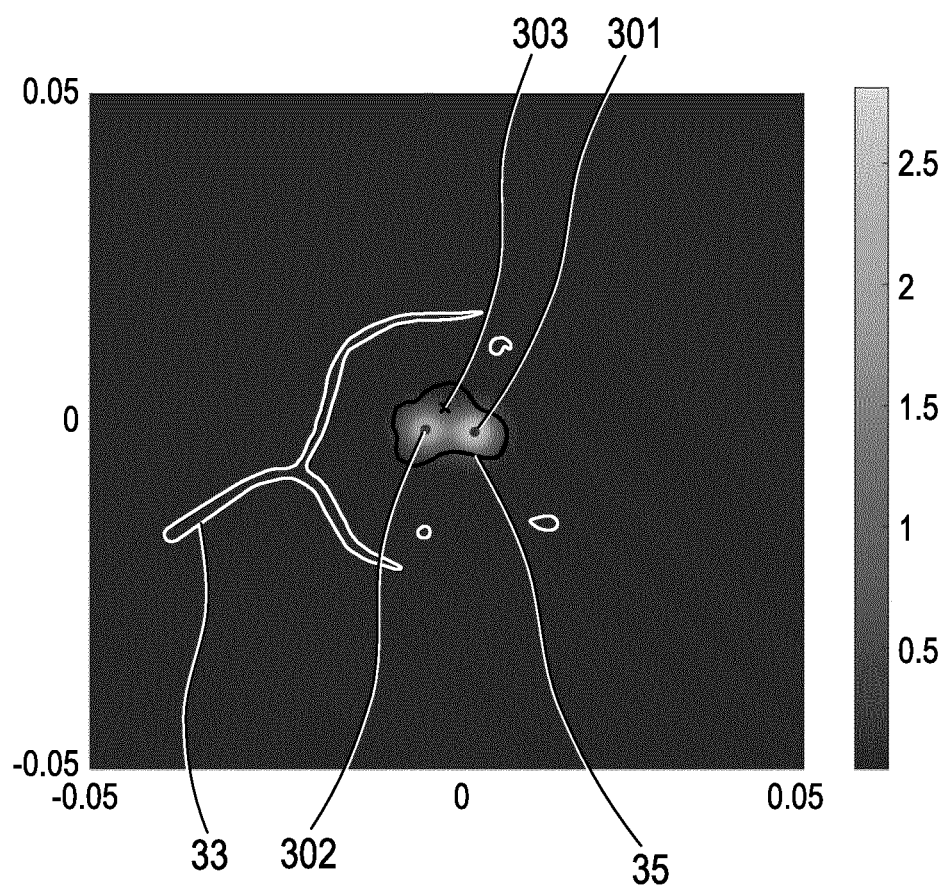
FIG. 19 illustrates a second thermal energy distribution resulting from the GMPP algorithm, after in an additional step one of the ablation probes has been deactivated.
Figure 20:
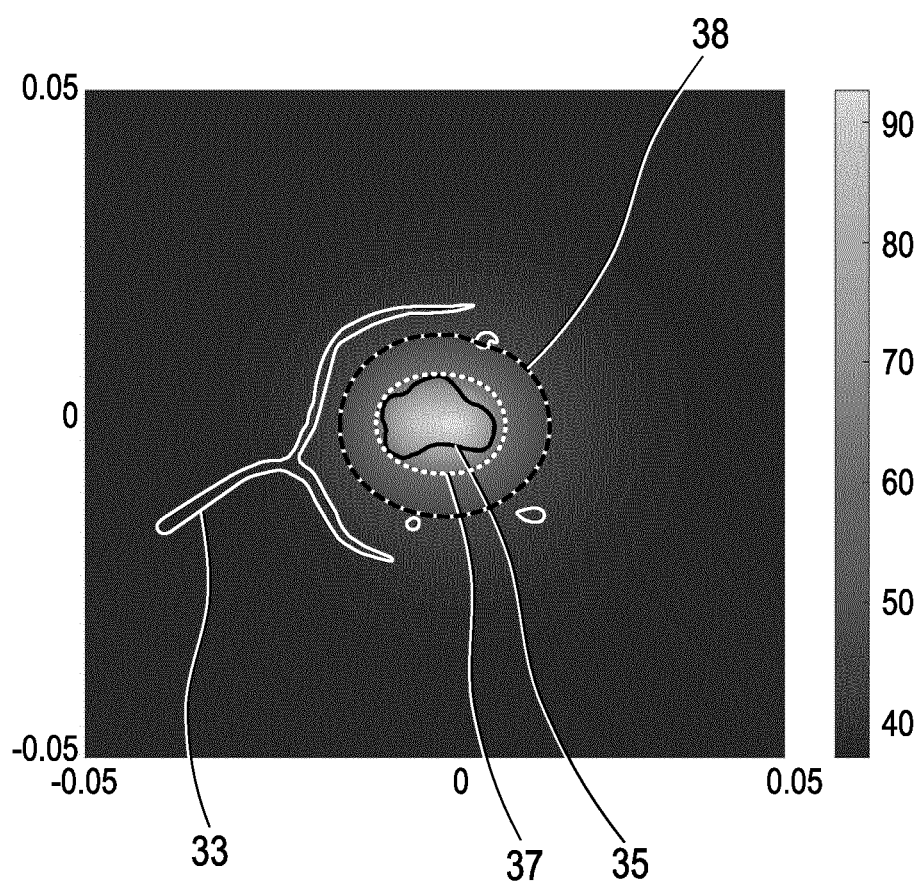
FIG. 20 illustrates a temperature distribution which corresponds to the second thermal energy distribution illustrated in FIG. 19.

This additional step can improve the final result of the planning procedure, because it deactivated the superfluous probes, i.e. if more probes that necessary have been placed by the GMPP, with this step their power will be set to zero. This is illustrated in FIG. 19 showing the thermal energy distribution resulting after this additional step has been carried out. In this example the third ablation probe 303 has been deactivated as indicated by a cross, wherein the first and second ablations probes 301 and 302 remain activated. The corresponding temperature field is illustrated in FIG. 20.

In the GMPP algorithm in the case of a single probe parameter being determined in each iteration step, the target thermal energy is preferentially updated to the initial target Q* minus the sum of the previously placed heat sources. However, simultaneous probe positioning is also a possibility. In this case the target thermal energy is always Q*, while in each iteration the number of probes is increased and thus the number of parameters to be determined is increased. It is noted that the user can also indicate a minimum number of desirable probes, and initialize the GMPP algorithm with this input. Then the method will propose positioning and power settings for the user probes and place additional probes if required. The final temperature based power optimization can then be used to determine how many of these probes should remain active.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the provision of the temperature-based condition, of the target temperature distribution, of the thermal energy functions, et cetera, like the determination of the first thermal energy distribution, like the determination of the ablation probe parameters, et cetera performed by one or several units or devices can be performed by any other number of units or devices. These procedures and/or the control of the planning apparatus in accordance with the planning method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a planning apparatus for determining an ablation probe parameter. A thermal energy determination unit determines, in a first part of a planning procedure, a first thermal energy distribution by using a thermal energy function like a Bioheat equation such that a temperature-based condition is fulfilled, which is indicative of a desired treatment outcome for a subject. An ablation probe parameter determination unit determines, in a second part, the ablation probe parameter by using a second thermal energy function, which relates a second thermal energy distribution to be caused by the ablation probe to b) the ablation probe parameter, such that a deviation between the first thermal energy distribution and the second thermal energy distribution fulfils a predefined deviation criterion. This dissection into two parts allows for an improved adaptability of the determination of the ablation probe parameter to different types of ablation procedures.

The invention claimed is:

1. A planning apparatus for determining an ablation probe parameter describing an operation of an ablation probe during an ablation procedure for ablating a part of a subject, the planning apparatus comprising:
   a computer; and
   a non-transitory computer readable medium having stored thereon a planning computer program comprising program code that, when executed, cause the computer to:
   provide a first thermal energy function defining a relation between a first thermal energy distribution to be calculated and a spatial temperature distribution and to provide a temperature-based condition being indicative of a desired treatment outcome for the subject including an ablation of the part of the subject,
   determine the first thermal energy distribution by using the first thermal energy function such that the temperature-based condition is fulfilled, the first thermal energy distribution being independent of a type of ablation procedure to be used for ablating the part of the subject,
   provide, prior to ablating the part of the subject, a second thermal energy function providing a relation between a) a second thermal energy distribution to be calculated and to be caused by the ablation probe and b) the ablation probe parameter,
   determine, prior to ablating the part of the subject, the ablation probe parameter by using the second thermal energy function such that a deviation between the first thermal energy distribution and the second thermal energy distribution fulfills a predefined deviation criterion, and
   output the ablation probe parameter to an ablation controller; and
   control the ablation controller to output power to the ablation probe in accordance with the ablation probe parameter and ablate the part of the subject without damaging a structure at risk.

2. The planning apparatus as defined in claim 1, wherein the program code further causes the computer to provide a) a spatial distribution of different components of the subject in a region including the part to be ablated and b) thermal properties of the different components, to provide the thermal energy function such that it depends on the spatial distribution of the different components and the thermal properties of the different components, and to determine the first thermal energy distribution by using the thermal energy function based on the spatial distribution of the different components and the thermal properties of the different components such that the temperature-based condition is fulfilled.

3. The planning apparatus as defined in claim 1, wherein the temperature-based condition is based on a deviation between a provided desired spatial temperature distribution and a calculated spatial temperature distribution, wherein the provided desired spatial temperature distribution is indicative of the desired treatment outcome and includes temperature values within the part to be ablated, wherein the temperature values are larger than a threshold temperature above such part that is ablated, and the calculated spatial temperature distribution resulting from using the first thermal energy function while determining the first thermal energy distribution.

4. The planning apparatus as defined in claim 1, wherein the program code further causes the computer to provide a user interface allowing a user to intervene in the determination of the first thermal energy distribution.

5. The planning apparatus as defined in claim 4, wherein the user interface is configured to receive a set of thermal energy distributions from the user, wherein the first thermal energy distribution is determined within the set of thermal energy distributions.

6. The planning apparatus as defined in claim 3, wherein the deviation of the calculated spatial temperature distribution and the desired spatial temperature distribution is a weighted deviation, wherein deviations in different regions of the subject are considered with different weights, wherein the different regions include at least a first region being defined by the part of the subject to be ablated and a second region that does not include the part of the subject to be ablated, wherein the program code further causes the computer to provide a user interface configured to receive the different weights from the user.

7. The planning apparatus as defined in claim 3, wherein the program code further causes the computer to provide an output being indicative of the calculated spatial temperature distribution resulting from using the first thermal energy function while determining the first thermal energy distribution, in order to allow the user to review a corresponding treatment outcome, and to provide a user interface configured to receive an input by the user of a modification of at least one of the first thermal energy function or the temperature-based condition and to initiate a further determination of the first thermal energy distribution based on the modification.

8. The planning apparatus as defined in claim 3, wherein the program code further causes the computer to evaluate the calculated spatial temperature distribution resulting from using the first thermal energy function while determining the first thermal energy distribution based on a predefined evaluation criterion, to modify at least one of the first thermal energy function or the temperature-based condition and to repeat the determination of the first thermal energy distribution based on the modification, if the evaluation indicates that the calculated spatial temperature distribution and hence a corresponding treatment outcome is insufficient.

9. The planning apparatus as defined in claim 1, wherein the ablation probe parameter includes at least one of a placement of the ablation probe relative to the part to be ablated or the power to be applied by the ablation probe.

10. The planning apparatus as defined in claim 1, wherein the program code further causes the computer to determine several ablation probe parameters for several ablation probes iteratively, wherein in each iteration step a further ablation probe of the several ablation probes is considered and one or several ablation probe parameters of at least the further ablation probe are determined by using the second thermal energy function such that a deviation between the first thermal energy distribution and the second thermal energy distribution fulfills a predefined second deviation criterion, wherein the iteration is stopped, if a predefined termination criterion is fulfilled.

11. The planning apparatus as defined in claim 10, wherein the program code further causes the computer to consider in each iteration step, a thermal energy distribution defined by a difference between the first thermal energy distribution and a thermal energy distribution that has been determined in a previous iteration step by using the second thermal energy function.

12. The planning apparatus as defined in claim 11, wherein the program code further causes the computer to determine in an iteration step among the iteration steps only the one or several ablation probe parameters of the further ablation probe considered in the iteration step.

13. An ablation system for ablating a part of a subject, the ablation system comprising:
the planning apparatus configured to determine the ablation probe parameter describing the operation of the ablation probe during the ablation procedure for ablating the part of the subject as defined in claim 1, and
the ablation probe configured to be operated in accordance with the determined ablation probe parameter.

14. A method for determining an ablation probe parameter describing an operation of an ablation probe during an ablation procedure for ablating a part of a subject, the method comprising:
providing a first thermal energy function defining a relation between a first thermal energy distribution to be calculated and a spatial temperature distribution and to provide a temperature-based condition being indicative of a desired treatment outcome for the subject including an ablation of the part of the subject,
determining the first thermal energy distribution by using the thermal energy function such that the temperature-based condition is fulfilled, the first thermal energy distribution being independent of a type of ablation procedure to be used for ablating the part of the subject,
providing, prior to ablating the part of the subject, a second thermal energy function providing a relation between a) a second thermal energy distribution to be calculated and to be caused by the ablation probe and b) the ablation probe parameter,
determining, prior to ablating the part of the subject, the ablation probe parameter by using the second thermal energy function such that a deviation between the first thermal energy distribution and the second thermal energy distribution fulfills a predefined deviation criterion, and
controlling the ablation probe in accordance with the ablation probe parameter during the ablation procedure and ablating the part of the subject without damaging a structure at risk.

15. A non-transitory computer readable medium having stored thereon a planning computer program for determining an ablation probe parameter describing an operation of an ablation probe during an ablation procedure for ablating a part of a subject, wherein the planning computer program comprises program code means for causing a planning apparatus to:

providing a first thermal energy function defining a relation between a first thermal energy distribution to be calculated and a spatial temperature distribution and to provide a temperature-based condition being indicative of a desired treatment outcome for the subject including an ablation of the part of the subject, determining the first thermal energy distribution by using the thermal energy function such that the temperature-based condition is fulfilled, the first thermal energy distribution being independent of a type of ablation procedure to be used for ablating the part of the subject, providing, prior to ablating the part of the subject, a second thermal energy function providing a relation between a) a second thermal energy distribution to be calculated and to be caused by the ablation probe and b) the ablation probe parameter, determining, prior to ablating the part of the subject, the ablation probe parameter by using the second thermal energy function such that a deviation between the first thermal energy distribution and the second thermal energy distribution fulfills a predefined deviation criterion, and outputting the ablation probe parameter to an ablation controller; and controlling the ablation controller to output power to the ablation probe in accordance with the ablation probe parameter and ablating the part of the subject without damaging a structure at risk.

16. The method of claim 14, further comprising:

providing a) a spatial distribution of different components of the subject in a region including the part to be ablated and b) thermal properties of the different components, wherein providing the thermal energy function depends on the spatial distribution of the different components and the thermal properties of the different components, and wherein determining the first thermal energy distribution using the thermal energy function is based on the spatial distribution of the different components and the thermal properties of the different components such that the temperature-based condition is fulfilled.

17. The method of claim 14, wherein the temperature-based condition is based on a deviation between a provided desired spatial temperature distribution and a calculated spatial temperature distribution, wherein the provided desired spatial temperature distribution is indicative of the desired treatment outcome and includes temperature values within the part to be ablated, wherein the temperature values are larger than a threshold temperature above such part that is ablated, and the calculated spatial temperature distribution resulting from using the first thermal energy function while determining the first thermal energy distribution.

18. The method of claim 14, further comprising:

receiving a set of thermal energy distributions from a user via a user interface, wherein the first thermal energy distribution is determined within the set of thermal energy distributions.

19. The method of claim 17, wherein the deviation of the calculated spatial temperature distribution and the desired spatial temperature distribution is a weighted deviation, wherein deviations in different regions of the subject are considered with different weights, wherein the different regions include at least a first region being defined by the part of the subject to be ablated and a second region that does not include the part of the subject to be ablated.

20. The method of claim 17, further comprising:

evaluating the calculated spatial temperature distribution resulting from using the first thermal energy function while determining the first thermal energy distribution based on a predefined evaluation criterion, modifying at least one of the first thermal energy function or the temperature-based condition, and repeating the determination of the first thermal energy distribution based on the modification, when the evaluation indicates that the calculated spatial temperature distribution and hence a corresponding treatment outcome is insufficient.

\* \* \* \* \*